United States Patent [19]
Fujii et al.

[11] Patent Number: 5,553,307
[45] Date of Patent: Sep. 3, 1996

[54] METHOD AND DEVICE FOR TRANSFERRING NONCONTIGUOUS BLOCKS IN ONE TRANSFER START BY CREATING BIT-MAP INDICATING WHICH BLOCK IS TO BE TRANSFERRED

[75] Inventors: Tetsuhiko Fujii, Kawasaki; Akira Yamamoto, Sagamihara; Tetsuzo Kobashi; Masahiko Sato, both of Odawara; Takao Satoh, Sagamihara, all of Japan

[73] Assignee: Hitachi, Ltd., Tokyo, Japan

[21] Appl. No.: 46,563

[22] Filed: Apr. 16, 1993

[30] Foreign Application Priority Data

Apr. 17, 1992 [JP] Japan .................................. 4-097658

[51] Int. Cl.$^6$ ...................................................... G06F 13/14
[52] U.S. Cl. .......................... 395/845; 395/844; 395/846; 395/440; 395/404; 364/DIG. 1; 364/245.1; 364/245.2; 364/246.3; 364/351.5; 364/DIG. 2; 364/952.1; 364/955.5; 364/957.1; 364/960.2
[58] Field of Search ...................... 395/275, 425, 395/650, 842, 843, 844, 846, 845, 404, 440

[56] References Cited

U.S. PATENT DOCUMENTS

| | | | |
|---|---|---|---|
| 5,274,807 | 12/1993 | Hoshen et al. | 395/650 |
| 5,317,713 | 5/1994 | Glassburn | 395/425 |
| 5,353,430 | 10/1994 | Lautzenheiser | 395/425 |
| 5,473,761 | 12/1995 | Parks et al. | 395/404 |

FOREIGN PATENT DOCUMENTS

| | | |
|---|---|---|
| 55-154650 | 2/1980 | Japan . |
| 57-90770 | 6/1982 | Japan . |
| 3-129552 | 6/1991 | Japan . |
| 3-172946 | 7/1991 | Japan . |
| 3-260750 | 11/1991 | Japan . |
| 3-248255 | 11/1991 | Japan . |

OTHER PUBLICATIONS (Japanese article)—"Interface", Jun. 1989; pp. 223–240.
DSO4-25205-1 Fujitsu Semiconductor Device Data Sheet–Hard Disk Controller for Magnetic Disk MB89342A/Mb89342AH.

*Primary Examiner*—Thomas C. Lee
*Assistant Examiner*—D. Dinh
*Attorney, Agent, or Firm*—Antonelli, Terry, Stout & Kraus

[57] ABSTRACT

A disk subsystem provided with a cache has a capability of executing writing of data of discontinuous dirty blocks on a cache memory into a disk and reading of data of discontinuous empty blocks on the cache memory through the effect of just one DMA transfer. When the dirty data discontinuously ranged on a cache segment is written on the disk, the microprocessor provides a bit-map to a harddisk controller (HDC) as control information for data transfer. If an i-th bit of the bit-map is "1", the HDC operates to write the i-th block data sent from a direct memory access controller (DMAC) onto the corresponding sector of the disk. If the i-th bit is "0", the microprocessor serves to stop the write of the data and control a read/write head to wait until it passes the corresponding sector.

30 Claims, 22 Drawing Sheets

BIT-MAP DATA    0 1 1 0 1 0 1 0

RAS

☐ : EMPTY BLOCK

▨ : DIRTY BLOCK

METHOD AND DEVICE FOR TRANSFERRING NONCONTIGUOUS BLOCKS IN ONE TRANSFER START BY CREATING BIT-MAP INDICATING WHICH BLOCK IS TO BE TRANSFERRED

BACKGROUND OF THE INVENTION

The present invention relates to a method and a device for transferring data between storage units, and more particularly to a method and device which may suitably apply to data transfer between a disk cache memory and a disk drive in a disk subsystem having a cache memory.

For the conventional disk subsystem, a disk cache memory has been proposed in JP-A-55-154650 for copying a part of the data stored in a disk drive to a semi-conductor memory and improving the access time of the disk subsystem. As another type, a disk cache memory adopting a write-back method has been also proposed in JP-A-55-15465. This disk cache memory is arranged to terminate a data write operation only when write data is written in a disk cache memory in response to a data write command issued from a host computer connected to a disk subsystem and then to write the write data to the disk drive.

A direct memory access (DMA) transfer, which corresponds to one method of data transfer between an I/O device and a memory, has been described in an Article of "How an interrupt and DMA are to be done", the Japanese monthly publication "Interface", June, 1989, pp. 223–240, CQ Shuppan-sha, issued on Jun. 1, 1989. The idea disclosed in this article reports that a head address and an area length of a data area to be transferred are just needed to be specified when data is transferred through the effect of the DMA transfer. Hence, one DMA transfer makes it possible only to transfer data on consecutive areas.

SUMMARY OF THE INVENTION

It is an object of the present invention to provide a method and a device for transferring a plurality of discontinuous data blocks through the effect of one DMA transfer.

It is another object-of the present invention to provide a method and a device for interactively transferring data between a disk cache memory and a disk drive through the effect of one DMA transfer.

In general, a disk cache memory is configured of a plurality of cache segments. The data transfer between the disk cache memory and the disk drive is carried out on the data of a cache segment as a transfer unit. The data of each cache segment is divisable into a predetermined number of data blocks each having the same size.

In the foregoing disk cache memory employing the write-back method, if the write data from a host computer is written on part of one cache segment, a disk controller provided in the disk subsystem, in general, operates to read the data (disk segment data) corresponding to the cache segment data from the disk drive, write the cache sediment in the disk cache memory, and then to write the write data from the host computer to the cache segment.

Such a data-write operation, however, includes an operating step of reading data from the disk. This reading step greatly increases the access time to the disk subsystem. Further, this reading operation indicates that even in a case where a cache segment is newly allocated for write data sent from the host computer and the write data is written on only a part of the cache segment, the corresponding disk segment data need not be read from the disk drive if the write data can be directly written on the cache segment without reading the corresponding disk segment data from the disk drive. If so, the access time of the disk subsystem will be greatly reduced.

This new writing method, however, may suffer from the shortcomings described below.

This writing method makes it impossible to write the data on the whole cache segment at a write-back mode on the disk drive as it is. This is because the cache segment data includes one or more non-data blocks (containing meaningless data) (referred to as "empty data block").

As another shortcoming, when some pieces of write data sent from the host computer are written on the same cache segment, it is presumed that "data block not reflected on the disk", that is, data block whose writing to the disk is not still completed (referred to as "dirty data block") exists in an interspersed manner.

Since a data block between the dirty data blocks is a data block whose writing to "an empty data block" or whose writing to a disk is completed (referred to as "clean data block"), it is necessary to execute DMA transfers two or more times for writing only the dirty data block interspersed on one cache segment. In a case in which the DMA transfers are executed two or more times, an interrupt frequently takes place by the microprocessor included in the disk controller. Hence, the microprocessor suffers from a larger overhead.

According to the present invention, in a case in which the write data from the host computer is not written on only part of the cache segment, a new writing method is provided for directly writing the write data into the cache segment without having to read the corresponding disk segment data from the disk drive. To avoid the presumable shortcomings, the writing method provides a capability of forming bit-map data for a disk write operation indicating whether or not each data block in the cache segment is a dirty data block.

The foregoing description has been directed only to the new writing method for writing the write data from the host computer for the purpose of more easily understanding the present invention. In actual practice, however, the new writing method needs to be considered in connection with the method for reading disk segment data from the disk.

To employ the new writing method, when the disk controller reads the disk segment data from the disk drive in response to the data read command from the host computer, the read disk segment data is not written on the corresponding the cache segment data as it is. This is because the dirty data block on the corresponding cache segment data may be written on the cache segment data. To avoid this, the writing method according to the present invention provides a capability of forming bit-map data for a disk read operation indicating whether or not the data block in the cache segment for each data block in the disk segment is an empty data block. As will be described below, the foregoing bit-map data for the disk write operation may be used in place of the bit-map data for the disk read operation.

With the bit-map data for disk write (or bit-map data for disk read), it is possible to perform writing of at least one dirty data block on one cache segment into the disk drive and writing of at least one data block read from the disk drive onto an empty data block on one cache segment through the effect of one DMA transfer.

By providing special bit-map data, according to an embodiment of the present invention, the write data from the host computer is allowed to be directly written on the cache segment on which the disk segment data read from the disk drive is not copied, for speeding up the access time of the disk subsystem.

As such, according to the embodiment of the invention, the provision of the special bit-map data makes it possible to process the write data from the host computer, written on the data block inside of the cache segment in a scattered manner, through one DMA transfer, thereby speeding up the processing of the disk subsystem.

Further, the provision of at least one special bit-map data makes it possible to perform an operation of writing the dirty data block written on the cache segment in a scattered manner and an operation of writing at least one data block read from the disk drive on an empty data block inside of the cache segment through the effect of one DMA transfer, thereby speeding up the processing of the disk subsystem.

DESCRIPTION OF THE PREFERRED EMBODIMENTS

At first, the description will be oriented to data transfer according to a first embodiment of the present invention with reference to FIGS. 1 to 8.

Figure 6:
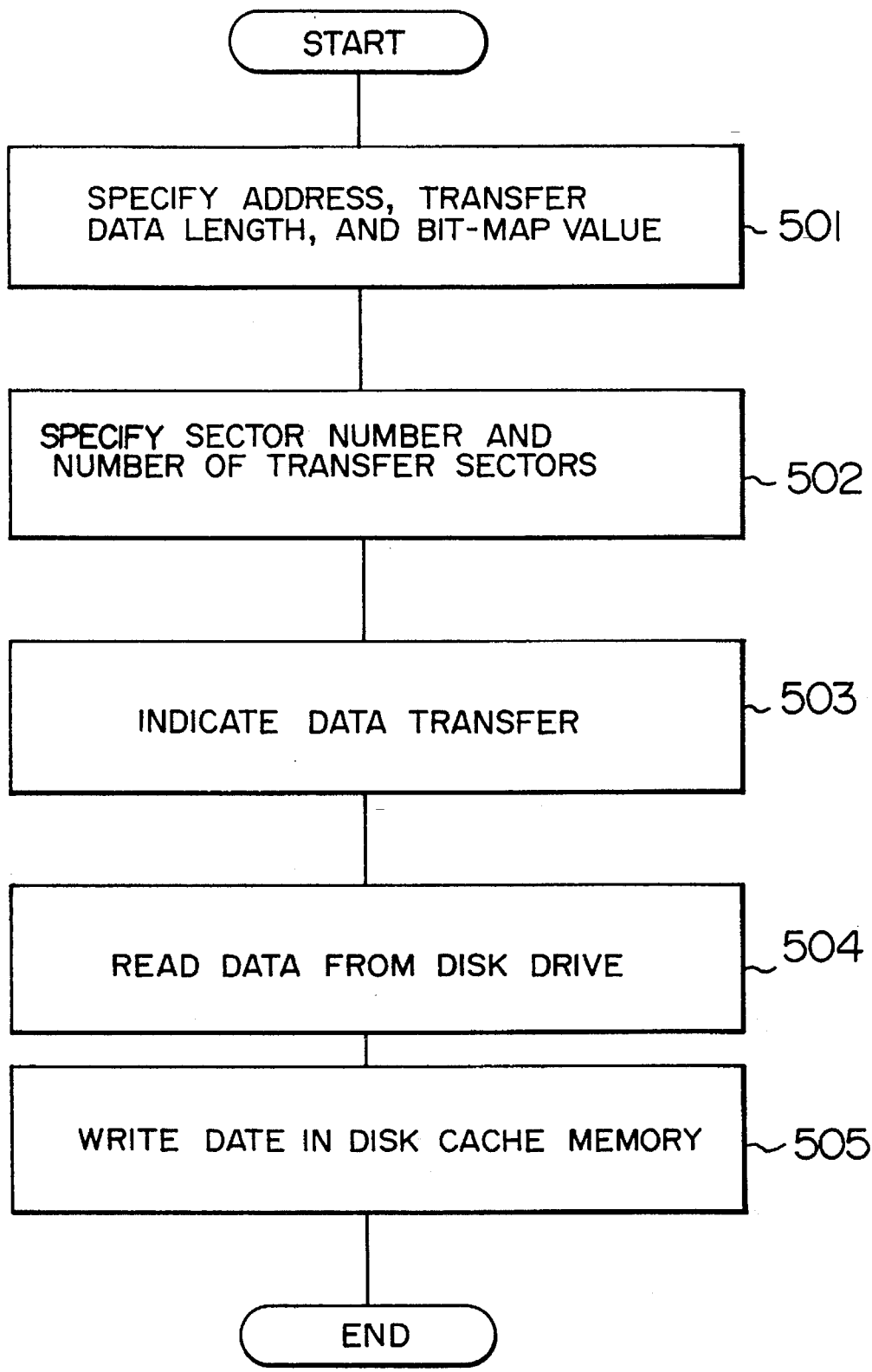
FIG. 6 is a flowchart showing a process of transferring data from the disk drive to the disk cache memory.
Figure 7:
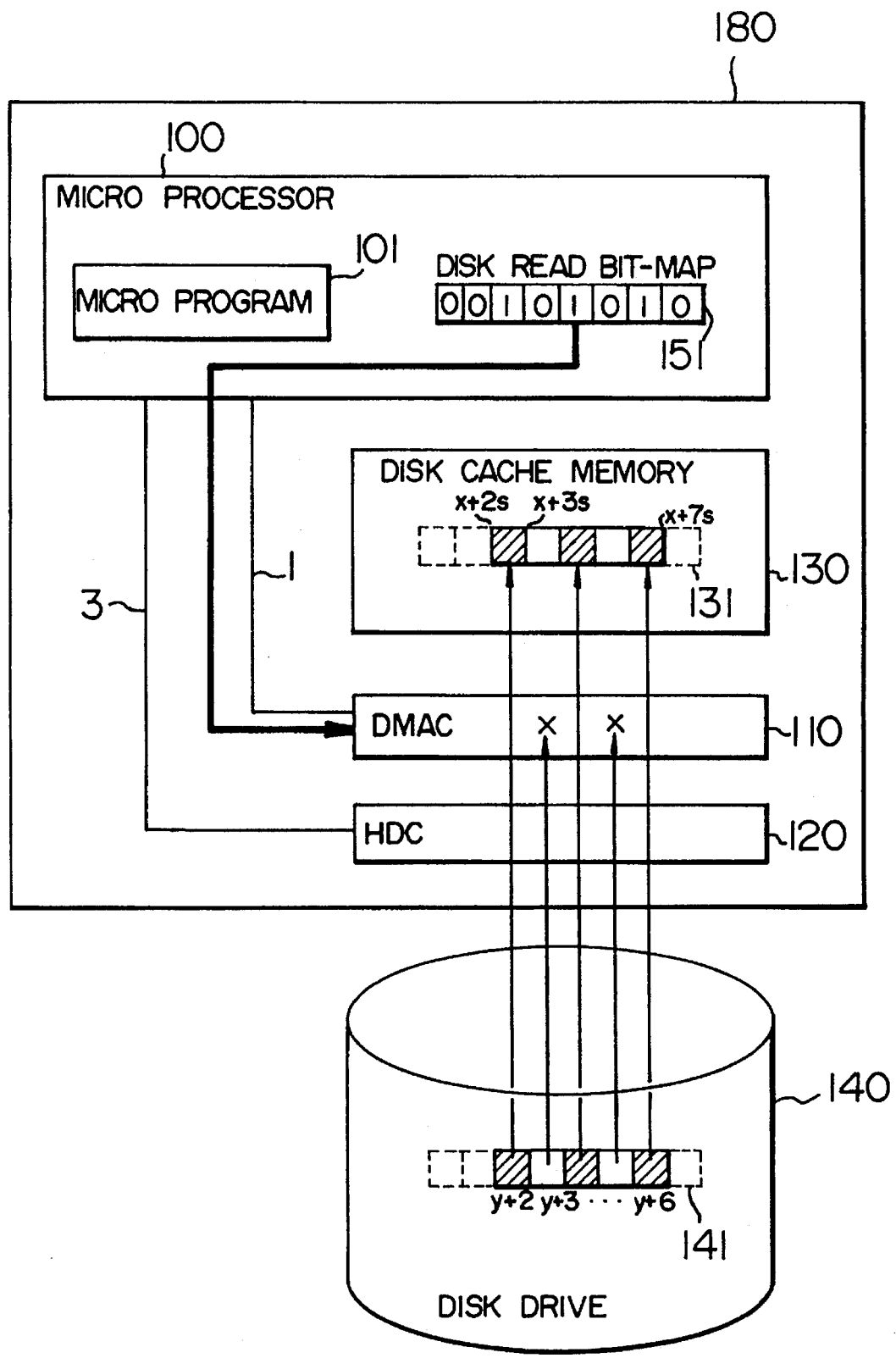
FIG. 7 is a view showing a disk subsystem to which data transfer from the disk drive to the disk cache memory according to a first embodiment of the invention applies.
Figure 8:
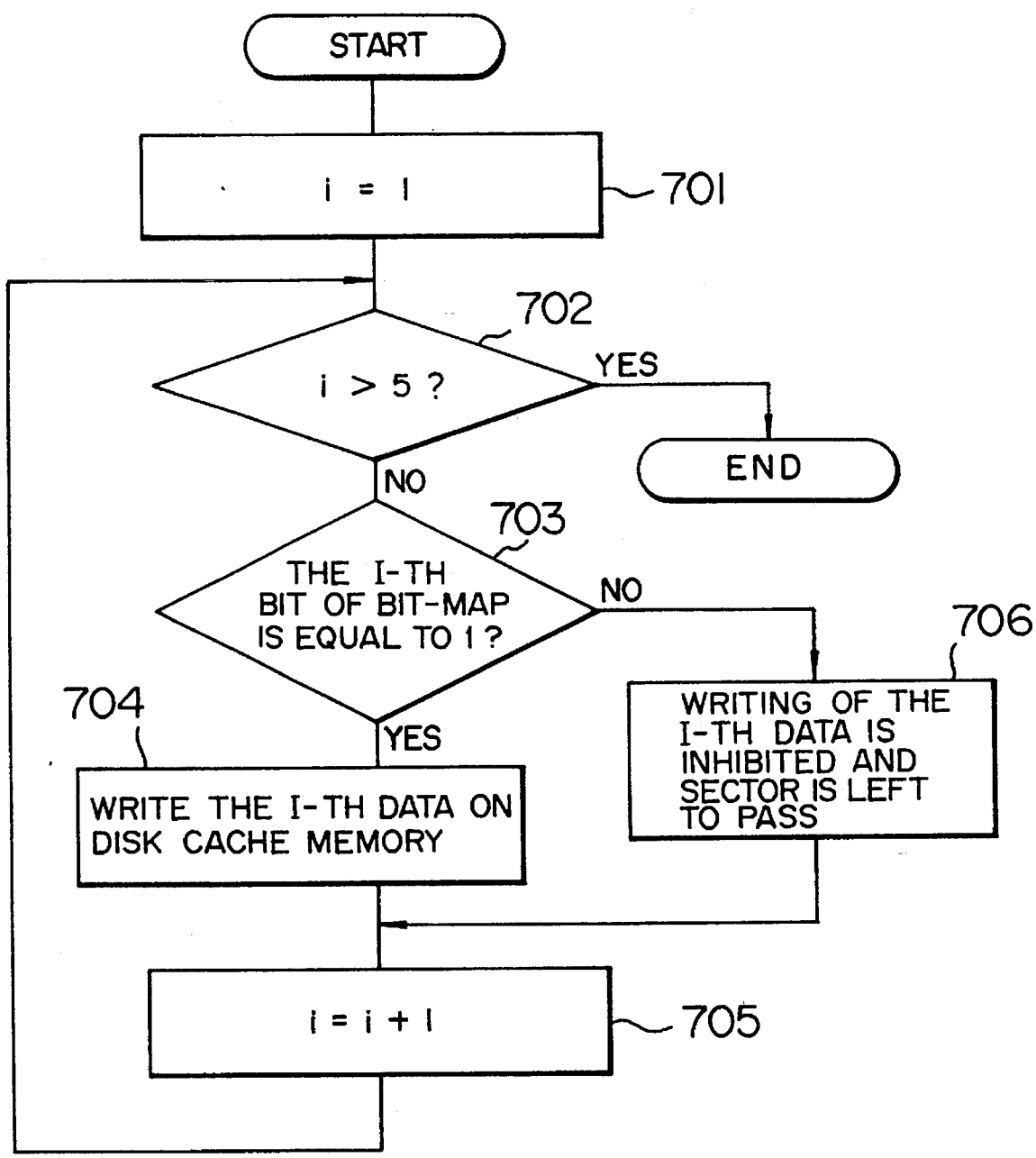
FIG. 8 is a flowchart showing a concrete process to be done by DMAC shown in FIG. 7 under the way of the processing shown in FIG. 6.

With reference to FIGS. 1 to 5, the description will be directed to a method of writing in a disk drive a plurality of discontinuous dirty data blocks existing in one cache segment inside of a disk cache memory by using a bit map for disk write and through the effect of one DMA transfer. With reference to FIGS. 6 to 8, the description will be directed to a method of writing a plurality of discontinuous data blocks existing in one disk segment in the disk drive by using a bit map for disk read and through the effect of one DMA transfer.

Figure 1:
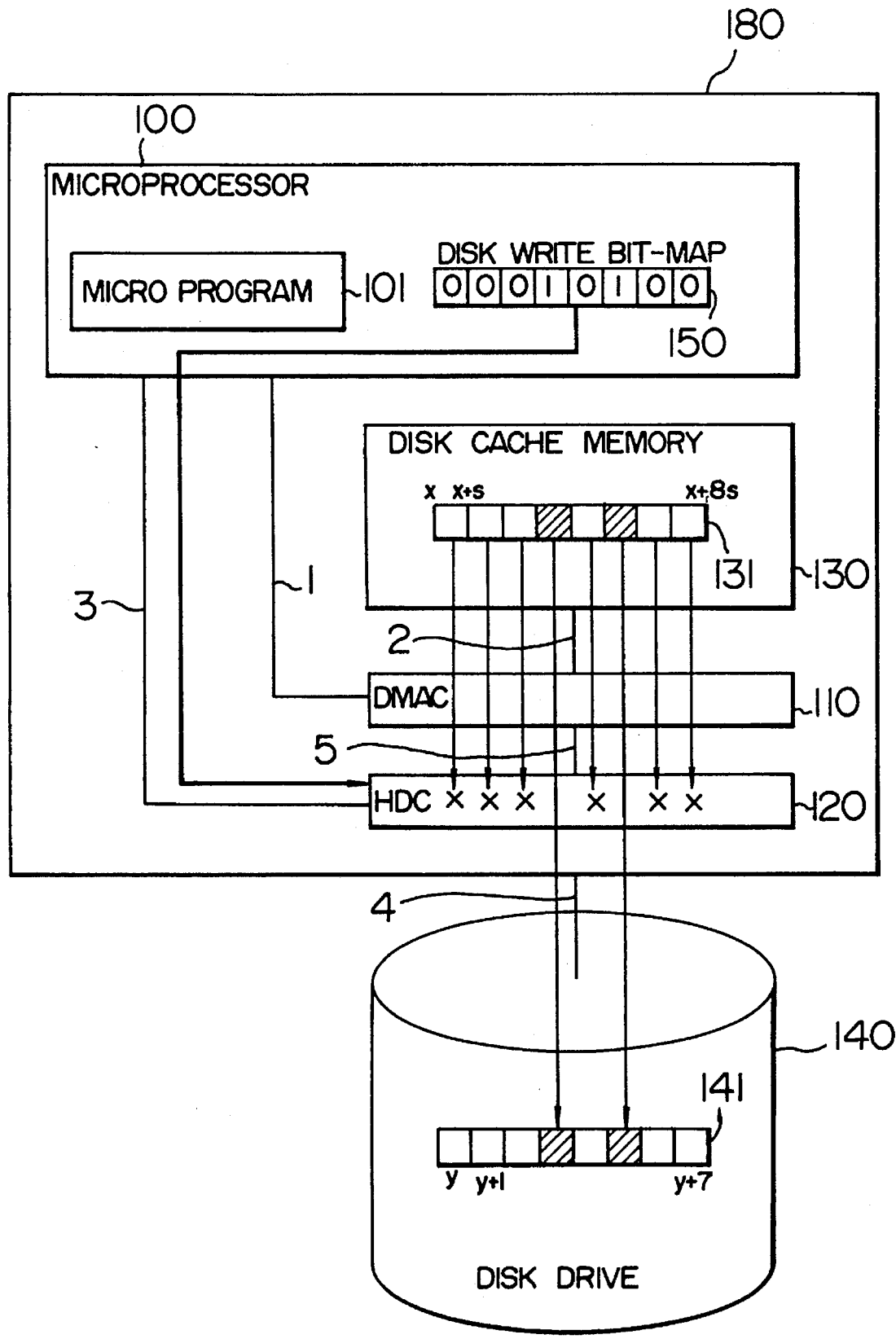
FIG. 1 is a view showing a disk subsystem to which data transfer from a disk cache memory to a disk drive according to a first embodiment of the invention applies.

FIG. 1 is a diagram showing a disk subsystem provided with a disk cache memory to which data transfer according to the invention applies. In FIG. 1, the disk subsystem is arranged to have a disk drive 140 and a memory controller 180. The memory controller 180 includes a microprocessor 100, a disk cache memory 130, a DMAC 110 for controlling the disk cache memory 130, and an HDC 120 for controlling the disk drive 140. Numerals 1 and 3 denote buses through which a control signal is transmitted from the microprocessor 100 to the DMAC 110 and the HDC 120. Numeral 2 denotes a bus through which a control signal is transmitted and data is transferred between the disk cache memory 130 and the DMAC 110. Numeral 4 denotes a bus through which a control signal is transmitted and data is transferred between the HDC 120 and the disk drive 140. Numeral 5 denotes a bus through which data transfer is executed between the DMAC 110 and the HDC 120.

Figure 2:
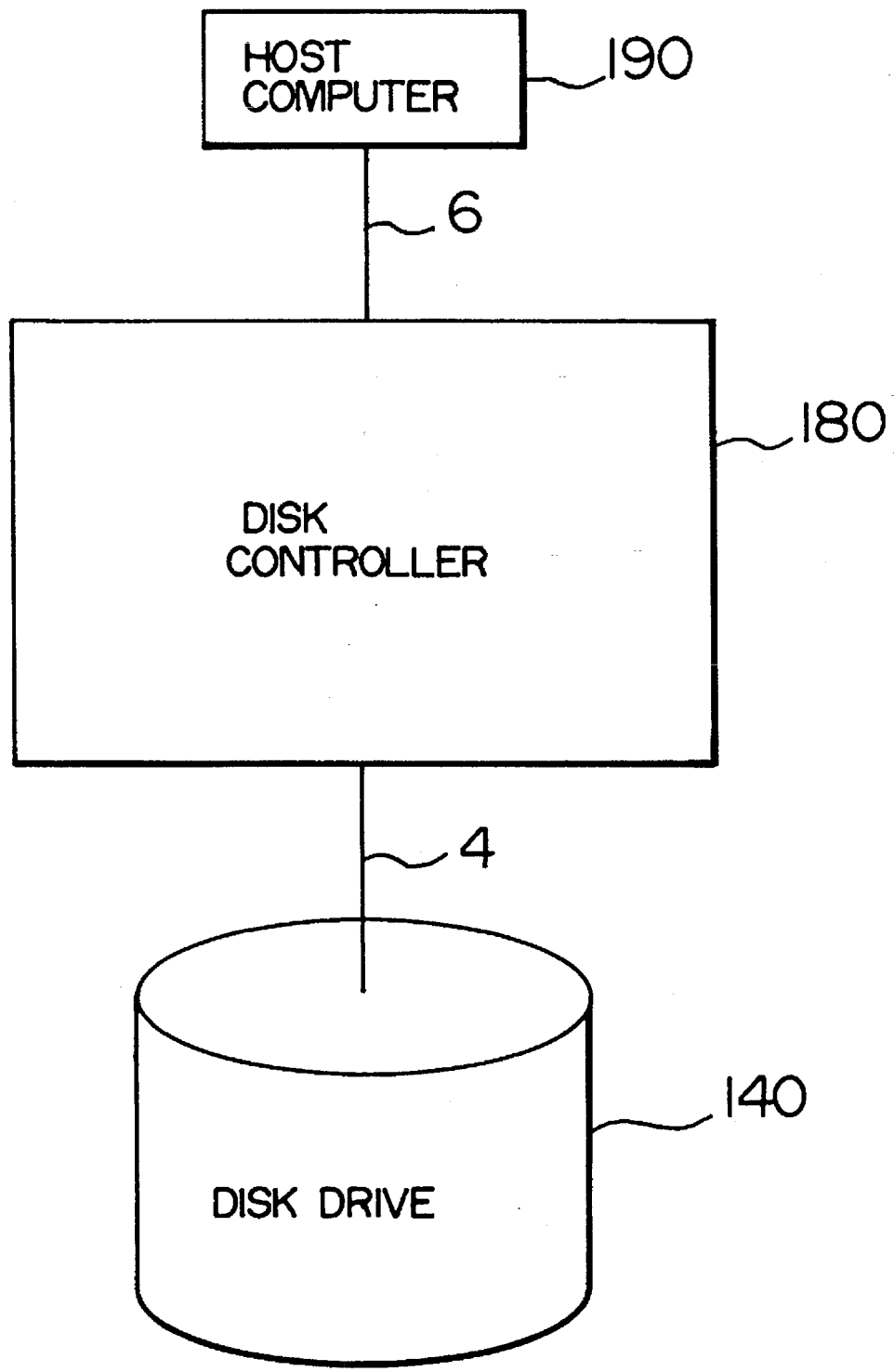
FIG. 2 is a block diagram showing a connecting relation between the disk subsystem shown in FIG. 1 and a host computer.

The disk controller 180 is, as shown in FIG. 2, connected to a host computer 190 through a bus 6 on which commands and data are transferred.

In FIG. 1, the microprocessor 100 includes a micro program 101 for storing a routine for data transfer according to the invention and a bit map 150 for disk write. The disk cache memory 130 is made up of a plurality of cache segments, each representatively denoted as 131. The data stored in the disk drive 140 is managed by a plurality of disk segments, each representatively denoted as 141.

Figure 3:
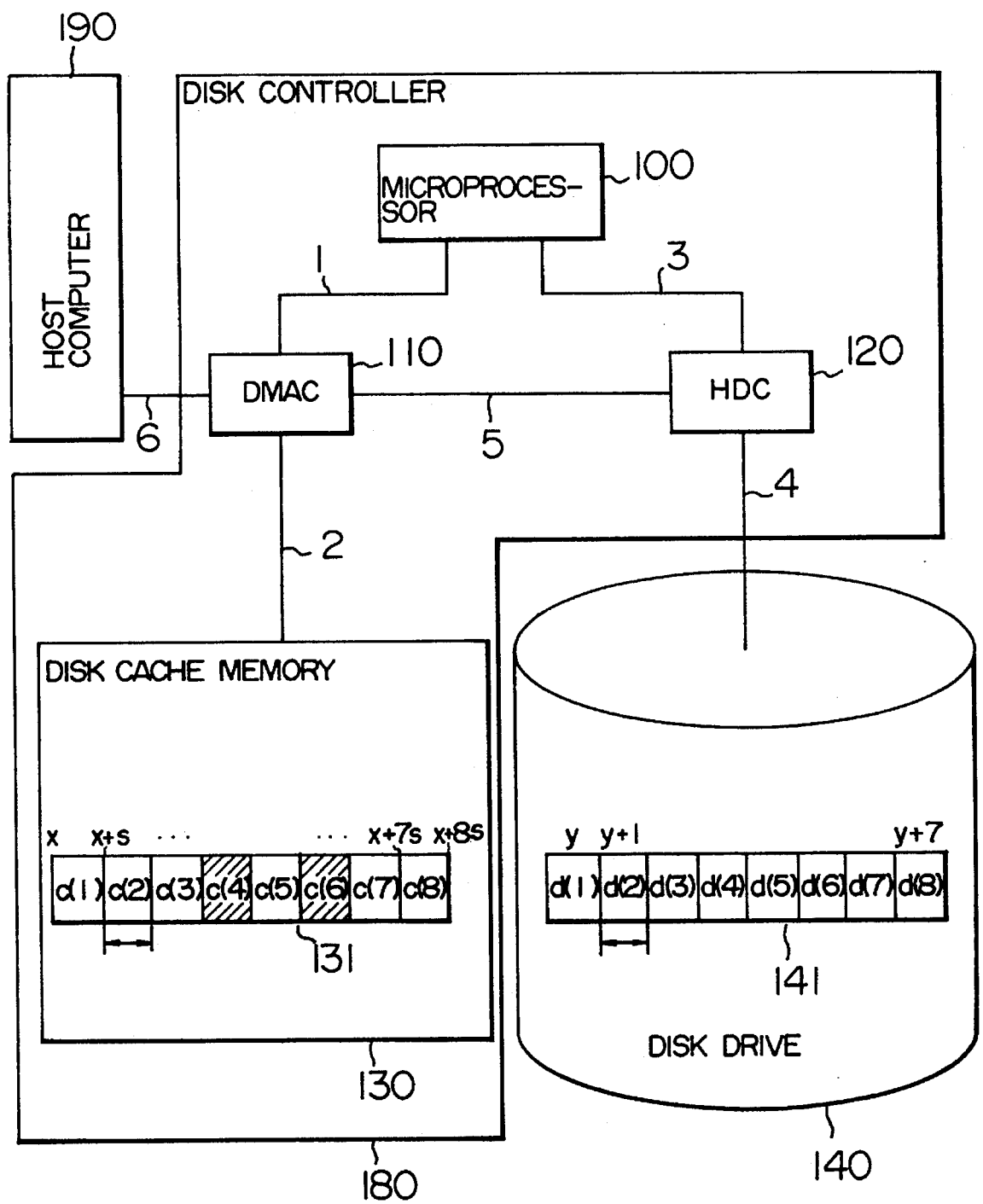
FIG. 3 is a view showing concrete arrangements of a cache segment inside of the disk cache memory shown in FIG. 1 and a disk segment inside of the disk drive shown in FIG. 1.

As shown in FIG. 3, to simplify the description of this embodiment, the cache segment 131 is made up of eight continuous data blocks c(1) to c(8). The disk segment 141 is made up of eight continuous data blocks d(1) to d(8). C(i)

denotes an i-th data block of the cache segment 131. d(i) denotes an i-th data block of the disk segment 141. Herein, one data block has a size of S bytes, which is the same as the cache segment 131 or the disk segment 141. In this embodiment, the S-byte data block corresponds to one-sector data of the disk drive.

The cache segment 131 stores continuous data blocks from addresses x to x+8s−1 of the disk cache memory 130. The disk segment 141 stores continuous data blocks from data block address y to y+7 of the disk driver 140.

Herein, assume that the host computer 190 outputs a data write command for requesting to write data for one data block in the data block d(4) in the disk segment 141 of the disk drive 140. At this time, it is assumed that the cache segment 131 corresponding to the disk segment 141 is not still allocated to the disk cache memory 130.

In the case as indicated above, the micro program 101 operates to newly secure the cache segment 131 in the disk cache memory 130 and allocate it to the disk segment 141. When the cache segment 131 is allocated to the disk segment 141, all the eight data blocks are empty. The micro processor 100 operates to control the DMAC 110 and write data transferred from the host computer 190 through the bus onto the data block c(4) on the cache segment 131 stored in the disk cache memory 130.

At this time, the micro program 101 reports data-write completion to the host computer 190. However, the data written on the data block c(4) is still not written on the data block d{4} inside of the disk segment 141. The micro processor 100 operates to write data on the data block c(4) onto the data block d(4) of the disk segment 141 stored in the disk drive 140 at a proper time. Hence, at this time, the data on the data block c(4) inside of the cache segment 131 is generally different from the data on the data block d(4) inside of the disk segment 141.

Then, it is assumed that the host computer 190 issues a data write command for requesting to write data for one data block to the data block d(6) on the disk segment 141 of the disk drive 140. Likewise, the micro program 101 operates to write the data received from the host computer 190 on the data block c(6) of the cache segment 131. Like the above, the data on the data block c(6) of the cache segment 131 is generally different from the data on the data block d(6) of the disk segment 141. At this time, of the eight data blocks on the cache segment 131, as shown in FIG. 3, the data blocks c(1), c(2), c(3), c(5), c(7) and c(8) are empty and the data blocks c(4) and c(6) are dirty data blocks.

A disk-write bit-map 150 is created in a memory (not shown in FIG. 1) inside of the disk controller shown in FIG. 1 as management information for each cache segment. The disk-write bit-map 150 indicates whether or not each data block on the cache segment 131 is a dirty data block. In the embodiment shown in FIG. 1, the disk-write bit-map 150 consists of eight bits. Each bit corresponds to each data block of the relevant cache segment 131. That is, in the disk-write bit-map 150, the bits 4 and 6 corresponding to the dirty data blocks c(4) and c(6) are "1" and the remaining bits are "0".

Figure 4:
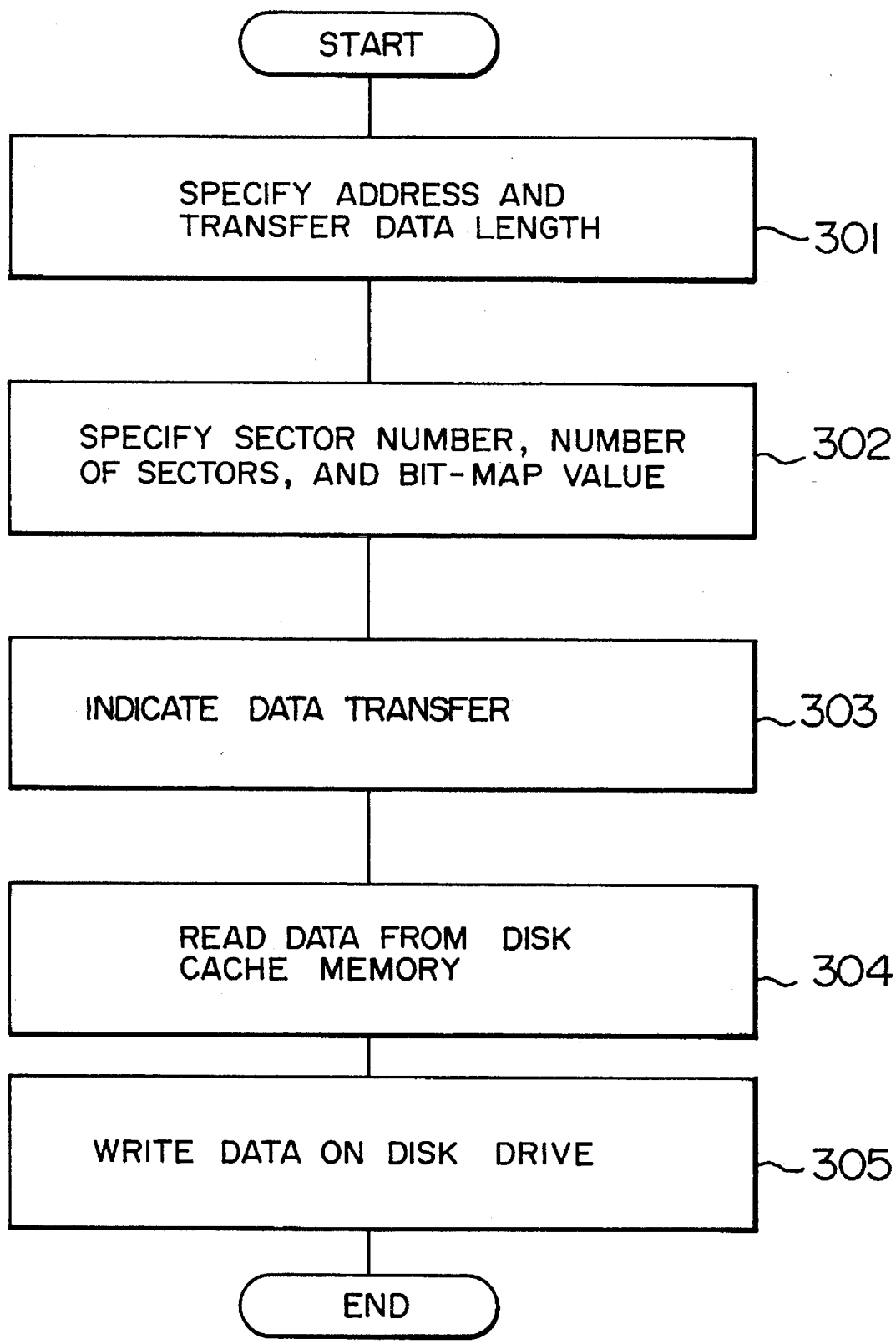
FIG. 4 is a flowchart showing a process of transferring data from the disk cache memory to the disk drive shown in FIG. 1.

The data transfer of the cache segment 131 from the disk cache memory 130 to the disk drive 140 is executed under the control of the micro program 101 according to the flowchart shown in FIG. 4. At a step 301, the micro program 101 operates to specify in the HDC 120 a head address and a transfer data length of the disk segment 141 whose data is to be written in the disk drive 140. At a step 302, the micro program 101 operates to specify a sector number, a number of sectors and a value of disk-write bit-map 150 about a dirty data block to be written in the HDC 120. At a step 303, the micro program 101 operates to indicate data transfer to the DMAC 110. At a step 304, the DMAC 110 reads data from the disk cache memory 130 for the cache segment 131. At a step 305, the HDC 120 writes the data from the DMAC 110 onto the disk drive 140.

Figure 5:
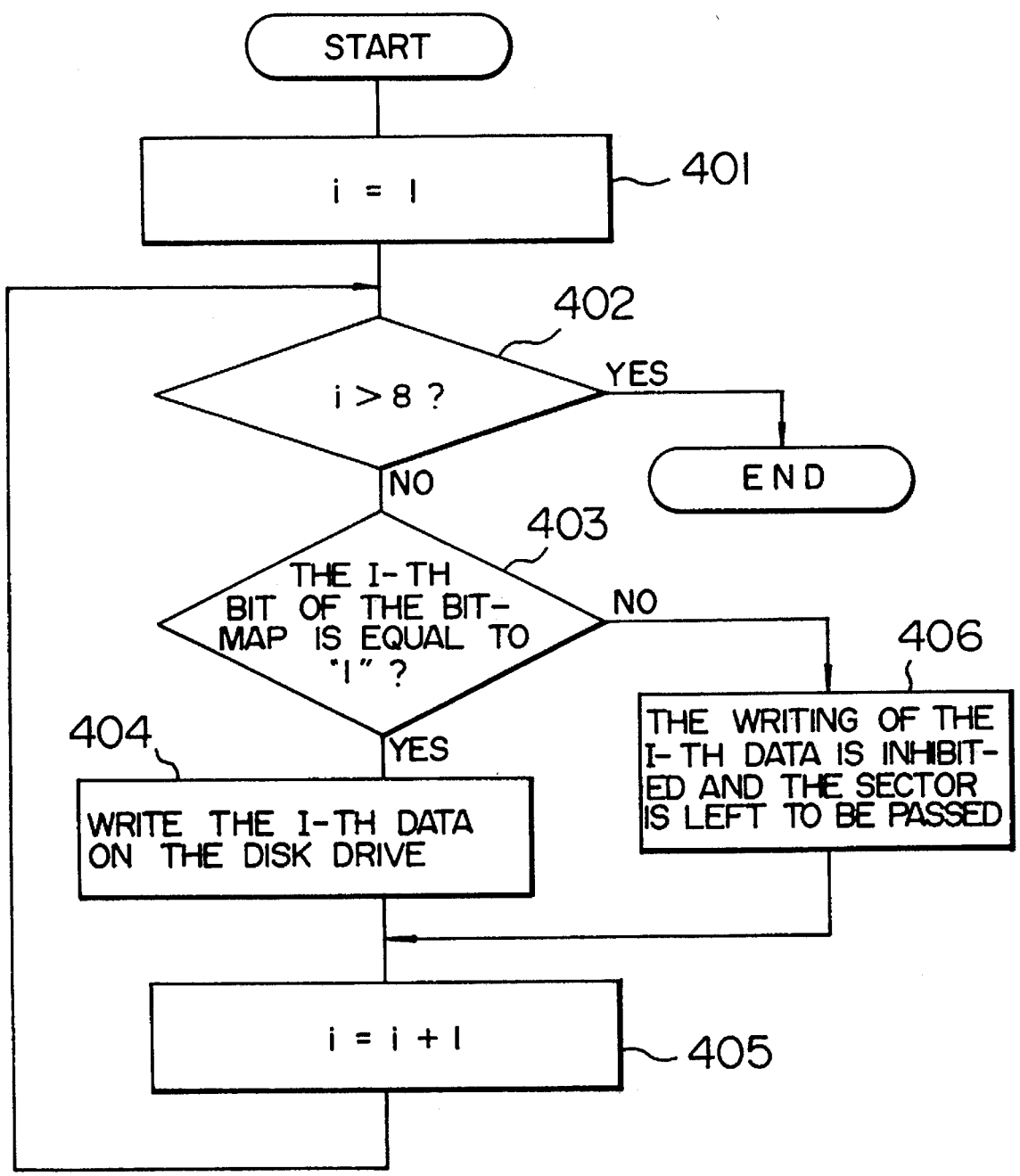
FIG. 5 is a flowchart showing a concrete process to be done by HDC shown in FIG. 1.

When the cache segment 131 is transferred from the disk cache memory 130 to the disk drive 140 by means of the HDC 120, according to the flowchart shown in FIG. 5, the micro program 101 determines whether the data transfer is to be done according to the disk-write bit-map 150.

At a step 401, a value i indicating which number of data block is to be processed is set as an initial value i=1. At a step 402, it is determined whether or not i=8. If i>8, the operation is terminated. If i is equal to or less than 8, the operation goes to a step 403. At this step, it is checked if the i-th bit value of the disk-write bit-map 150 is "1" or "0". If the bit value has a value of "1", the operation goes to a step 404. At this step, the data on the i-th data block C(i) sent from the DMC 110 is written on a section of a sector number y+(i−1), that is, d(i). At a next step 405, a value of i is incremented by 1. Then, the operation jumps to a step 402. If, at a step 403, the bit value is "0", the operation goes to a step 406 at which the writing of data to the i-th data block is inhibited. The corresponding sector is passed to wait for the next sector coming to a proper position.

As is apparent from FIG. 1, according to this embodiment, the DMAC 110 operates to read all the data requested to be written by the host computer 190 from the disk cache memory 130 and send it to the HDC 120. The HDC 120 selects only one or more dirty data blocks from the data sent from the DMAC 110 according to a bit value of the disk-write bit-map 150 and writes them on the data block for the disk segment 1141 of the disk driver 140, that is, the sector. The read/write head (not shown) of the disk driver 140 detects a sector pulse on which the HDC 120 can know the current sector.

Next, the data transfer of the disk segment 141 from the disk drive 140 to the disk cache memory 130 is carried out by the micro program 101 according to the flowchart shown in FIG. 6. Herein, it is assumed that the host computer 190 issues a data read command for requesting the data from the data blocks c(3) to c(7) of the cache segment 131 to be read from the disk drive. In this case, since the data blocks c(4) and c(6) of the cache segment 131 are dirty data blocks, the data from the disk drive 140 to the cache segment 131 has to be transferred only to the empty data blocks c(3), c(5) and c(7) in avoidance of these dirty data blocks of the cache segment 131.

In FIG. 6, at a step 501, the micro program 101 specifies in the DMAC 110 a head address x+2s, a transfer byte 5s and the content "00101010" of the disk-read bit-map for an object area in the cache segment 131. Next, at a step 502, the micro program 101 specifies in the HDC 120 a head sector number y+2 and a sector number 5 for an object area in the disk segment 141. At a step 503, the data transfer from the HDC 120 to the DMAC 110 is specified in the DMAC 110 and the HDC 120. At a step 504, the HDC 120 operates to read the data on the continuous five sectors starting from the sector y+2 in the disk segment 141 of the disk drive 140 and transfer the data to the DMAC 110 through the bus 5. At a step 505, the DMAC 110 writes in the cache segment 131 the data on only the data block(s) having a bit value "1" of the disk-read bit-map 151 and controls to inhibit writing of the data block having a bit value of "0". That is, the data on the data blocks (sector) d(4) and d(6) is discarded as it is. The data on the data blocks d(3), d(5) and d(7) is written on the data blocks c(3), c(5) and c(7) of the cache segment 131.

The flow of the data in the flowchart shown in FIG. 6 is shown in FIG. 7. As is apparent from FIG. 1, according to this embodiment, the HDC 120 reads all the data requested to be read by the host computer 190 from the disk drive 140 and sends the data to the DMAC 110. The DMAC 110 selects only an empty data block(s) from the data sent from the HDC 120 according to a bit value of the disk-read bit-map 151 and writes the data on the selected empty data block(s) in the disk cache memory 130.

The DMAC 110 performs the operation shown in FIG. 8. At first, at a step 701, a value of "1" is substituted for i. At a next step 702, it is determined if a value of i exceeds the number "5" of data blocks. If yes, the operation is terminated. If i is equal to or more than "5", the operation goes to a step 703. At this step, it is checked if the i-th bit of the disk-read bit-map 151 is "1" or "0". If the bit value is "1", the operation goes to a step 704. At this step, the micro program operates to write the data on the sector of the sector number y+(i+1), that is, the data block d(i+2), on the s-byte data on the block starting from the head address x+(i+1)s of the disk cache memory 130, that is, the data on the data block c(i+2) of the cache segment 131. Then, the operation goes to a step 705. At the step 703, if the bit value is "0", the operation goes to a step 706. At this step, the micro program inhibits writing of the data on the sector of the sector number y+(i+1) sent from the HDC 120 on the s-byte data on the sectors starting from the head address x+(i+1)s of the disk cache memory 130, that is, the data on the data block d(i+2) of the cache segment 131. Then, the operation goes to a step 705. At this step, the value of i is incremented by "1". Then, the operation jumps to the step 702. The increment of i is done each time the data transfer for one sector is terminated. The DMAC 110 enables to know the termination of data transfer for one sector by counting the number of bytes of the data to be processed by itself.

The foregoing method makes it possible to perform data transfer between discontinuous data areas on the cache segment 131 and discontinuous data areas on the corresponding data segment 141 through the effect of one DMA transfer. In this embodiment, if the data is written onto the disk cache memory 130, the DMAC 110 determines if the data is written by using its bit-map. If the data is written onto the disk drive 140, the HDC 120 determines if the data is written by using its bit-map.

In this embodiment, the disk write bit-map 150 has a different bit-map from the disk read bit-map 151. If, however, the same data is allowed to be written on the clean data block of the cache segment 131 or the disk segment 141 twice, any one of the disk write bit-map 150 and the disk read bit-map 151 may be used for both of the DMAC 110 and the HDC 120.

The concrete arrangement of the disk controller 180 according to the embodiment described above will be shown in FIG. 9.

Figure 9:
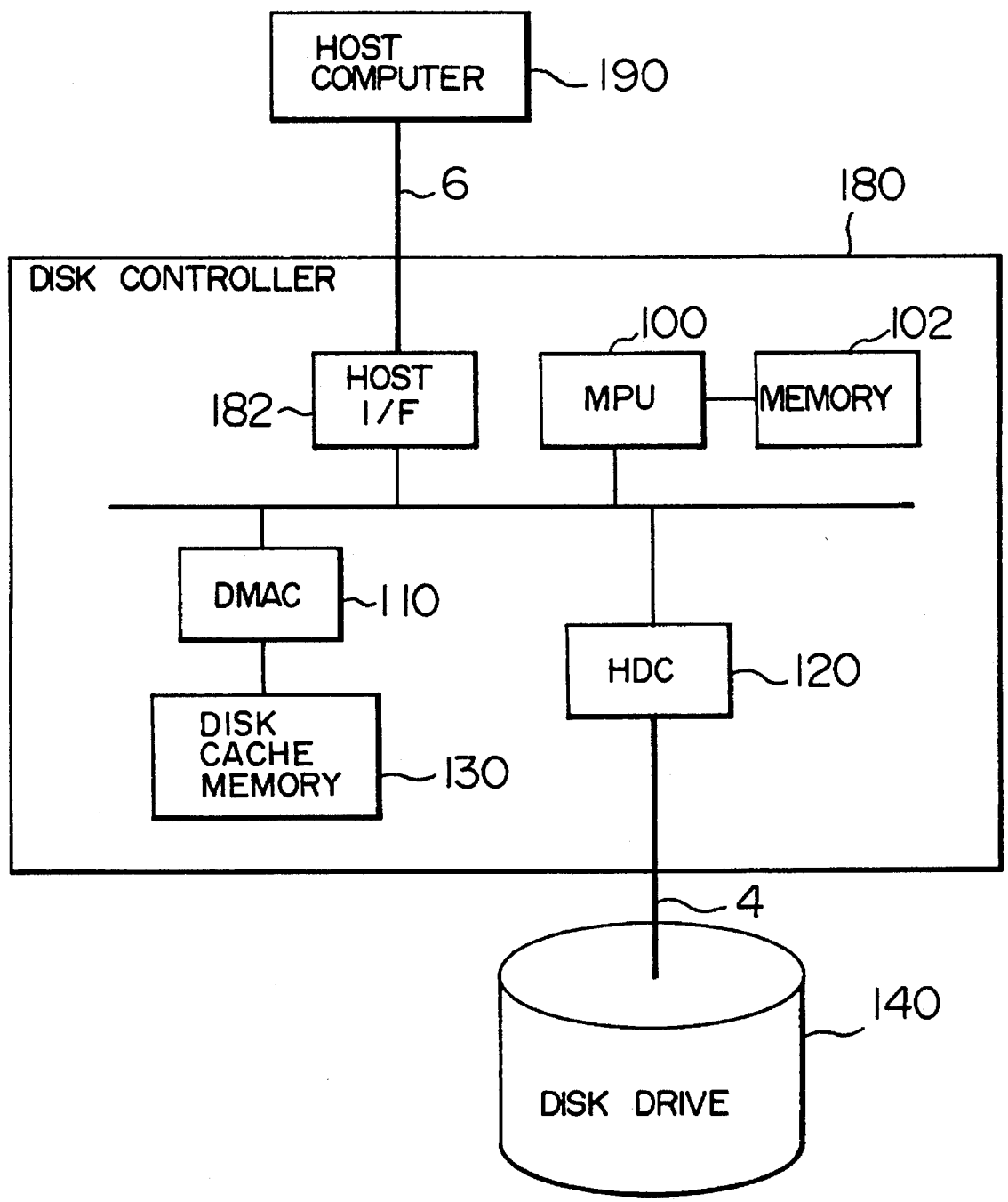
FIG. 9 is a block diagram showing a concrete arrangement showing a disk subsystem for doing data transfer shown in FIGS. 1 and 7.
Figure 10:
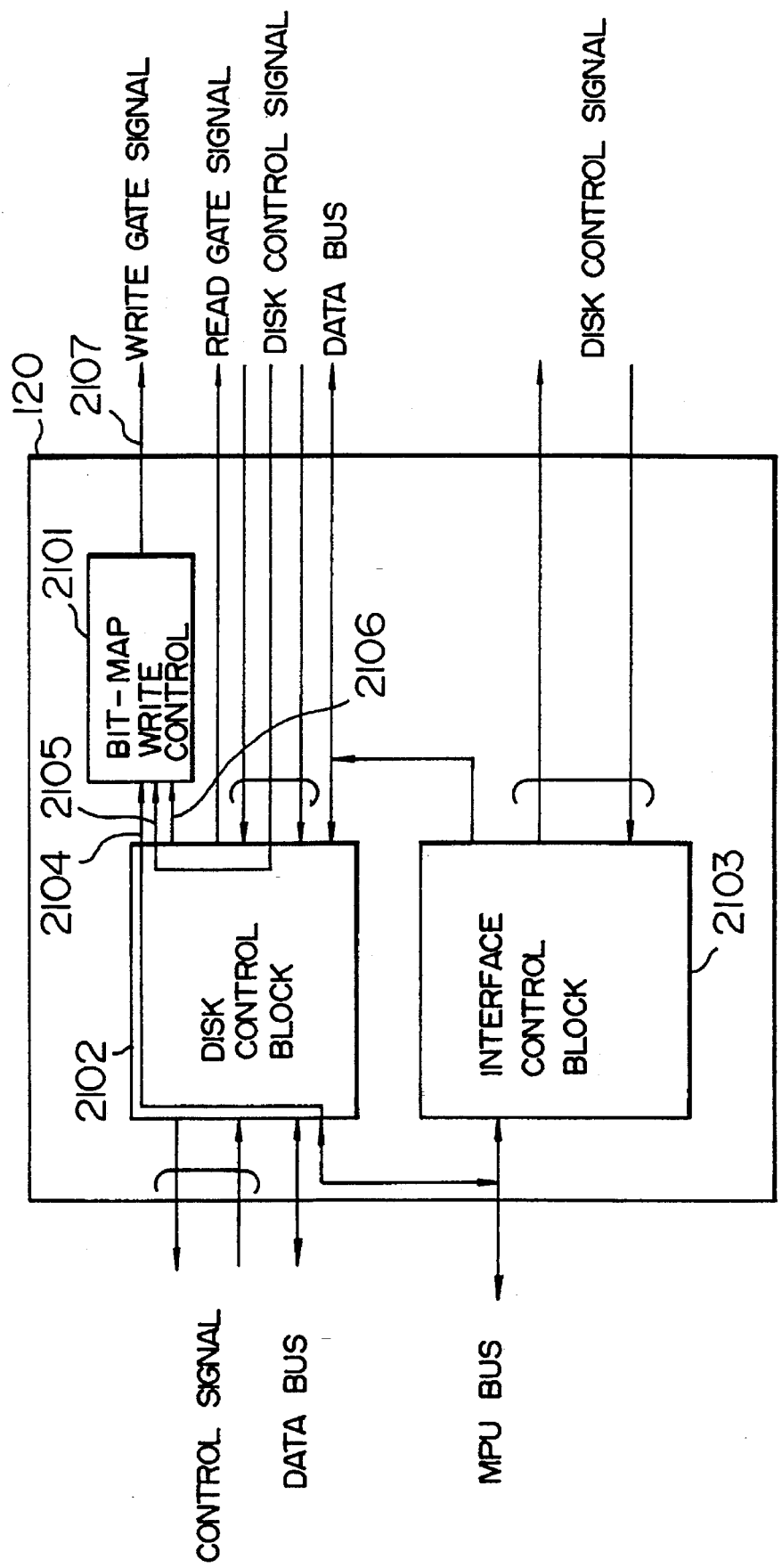
FIG. 10 is a view showing a concrete arrangement of a hard disk controller (HDC) shown in FIG. 9.
Figures 11, 12:
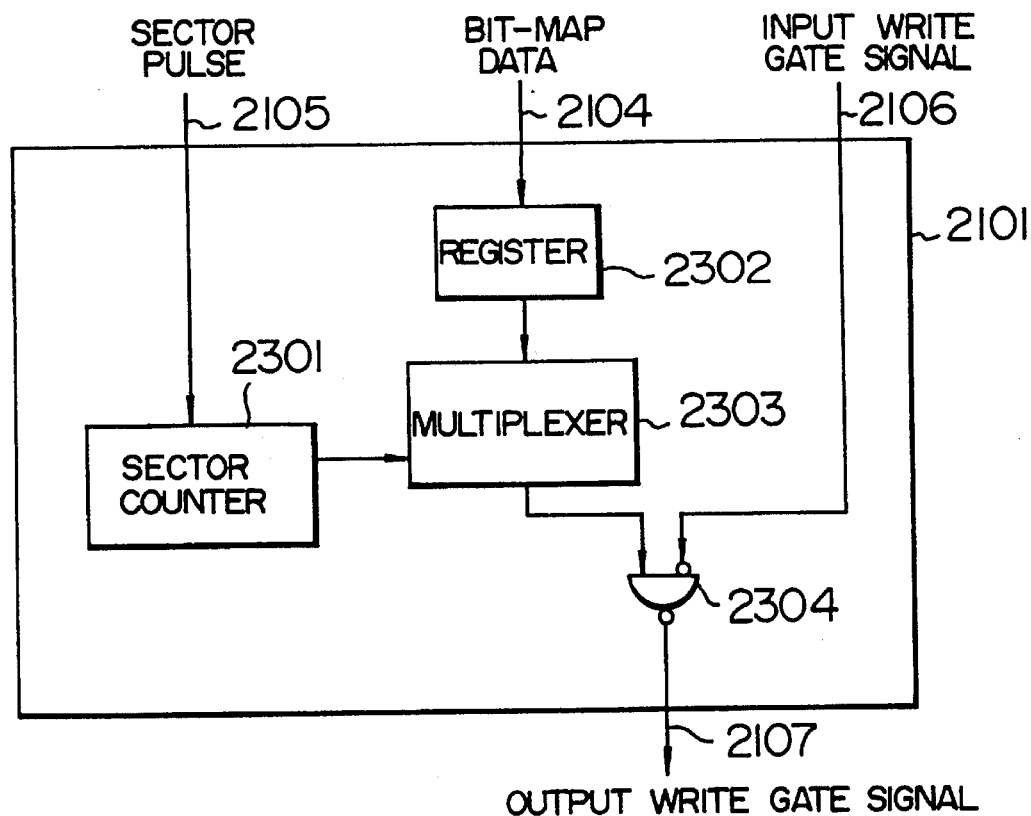
FIG. 11 is a timing chart showing a relation between a bit-map data and an output signal shown in FIG. 10.
FIG. 12 is a block diagram showing a concrete arrangement of a bit-map write control block shown in FIG. 10.
Figure 13:
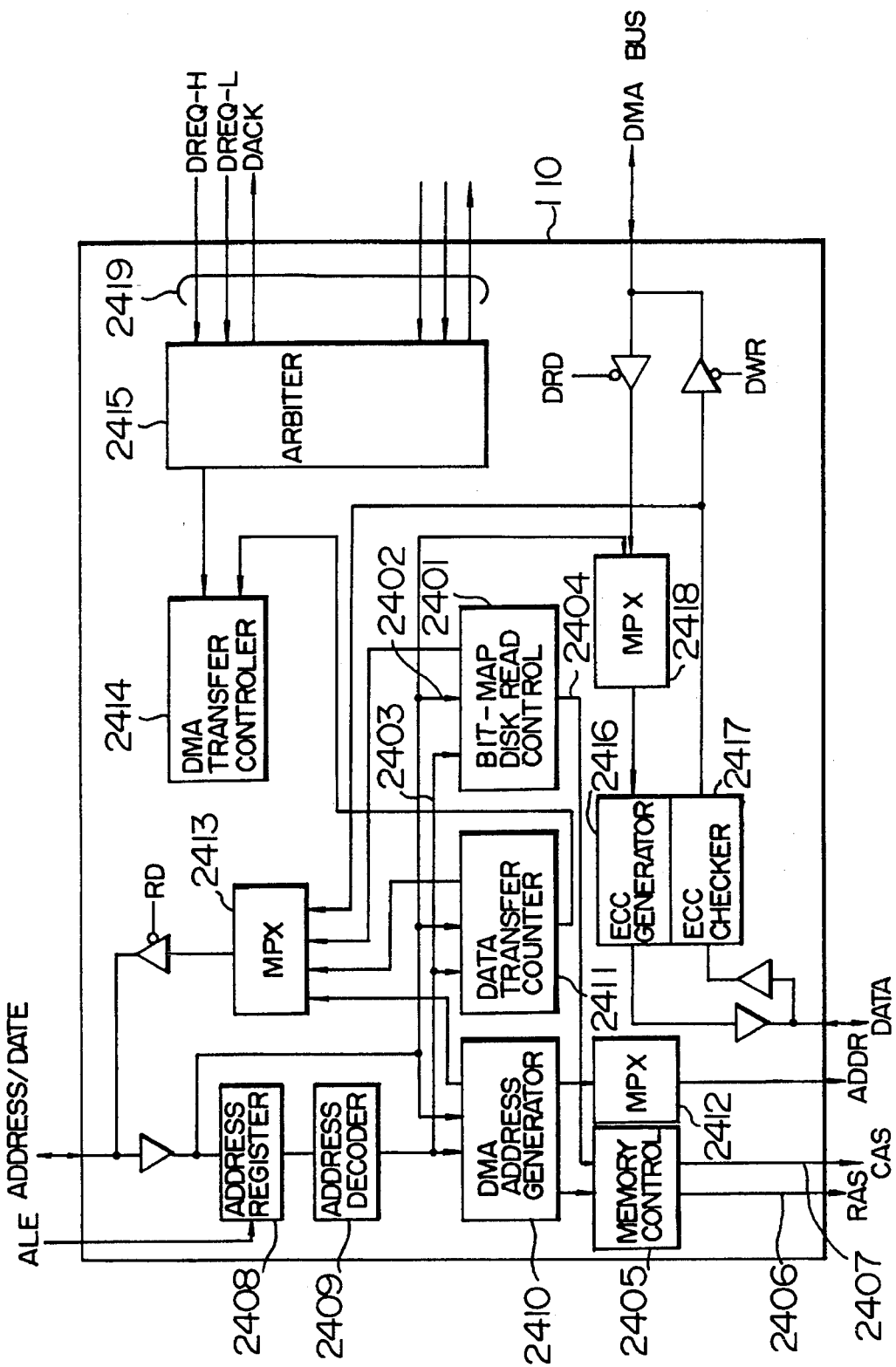
FIG. 13 is a block diagram showing a concrete arrangement of a DMA controller (DMAC) shown in FIG. 9.
Figure 14:
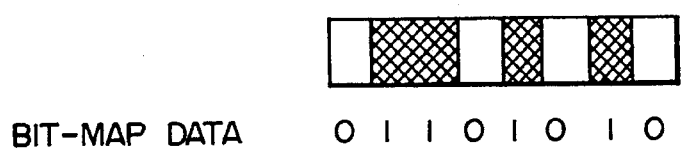
FIG. 14 is a timing chart showing a relation between a bit-map data and an output signal shown in FIG. 13.
Figure 14:
Figure 14:
Figure 15:
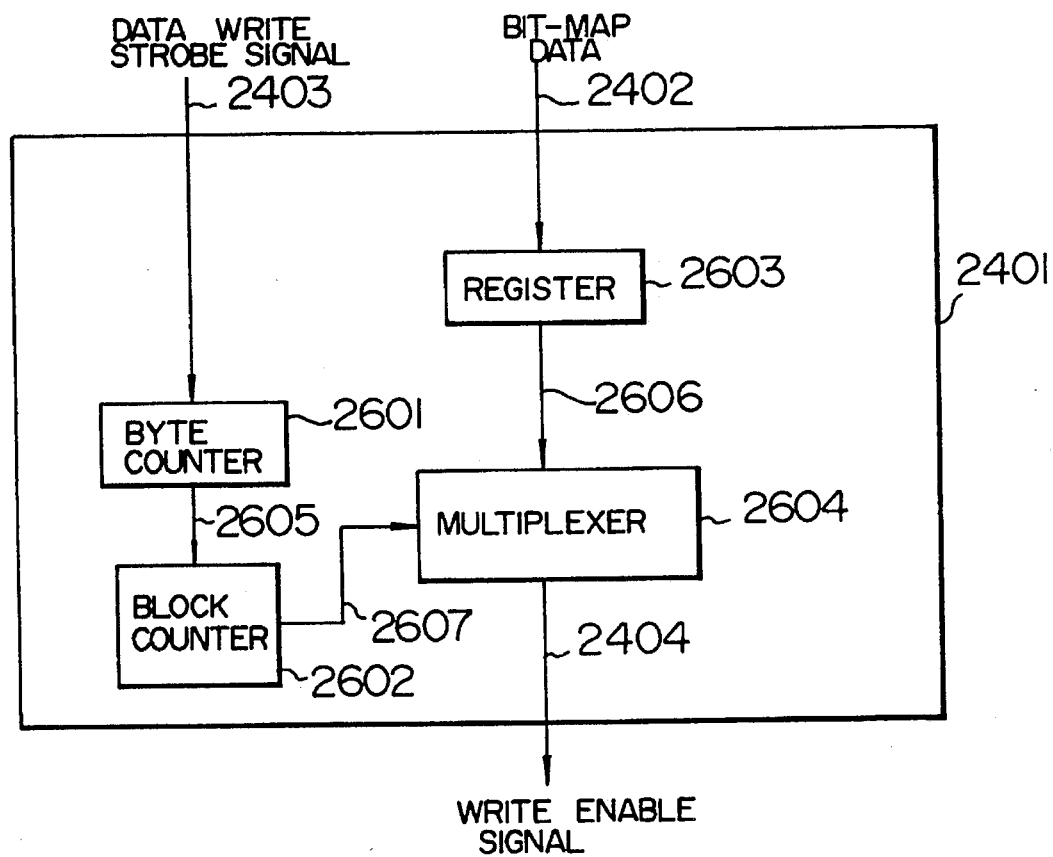
FIG. 15 is a block diagram showing a concrete arrangement of a bit-map disk read control block shown in FIG. 13.

FIG. 9 is a block diagram showing a disk controller 180. FIG. 10 is a function block diagram showing the HDC 120. FIG. 11 is a timing chart appearing when the bit-map disk-write operation can be performed. FIG. 12 is a circuit diagram showing a bit-map disk write control block in the HDC 120. FIG. 13 is a function block diagram showing the DMAC 110. FIG. 14 is a timing chart on which the DMAC 110 performs the bit-map disk-read operation. FIG. 15 is a circuit diagram showing a bit-map disk read control block to be used in the DMAC 110.

Next, the description will be directed to each component shown in the above drawings.

In FIG. 9, numeral 190 denotes a host computer. Numeral 180 denotes a disk controller. Numeral 140 denotes a disk drive. Numeral 6 denotes a bus connecting the host computer 190 with the disk controller 180. Numeral 4 denotes a path connecting a disk controller 180 with the disk drive 140. Numeral 100 denotes a micro processor (MPU). Numeral 102 denotes a memory for storing a disk-write bit-map and a disk-read bit-map. Numeral 130 denotes a disk cache memory. Numeral 110 denotes a DMAC. Numeral 120 denotes an HDC. Numeral 182 denotes a host interface connecting to the bus 6 from the host computer 190.

In FIG. 10, numeral 120 denotes an HDC. Numeral 2101 denotes a bit-map write control block. Numeral 2102 denotes a disk control block. Numeral 2103 denotes an interface control block. Numeral 2104 denotes an interface control block. Numeral 2104 denotes a data line through which a bit-map data is transmitted. Numeral 2105 denotes a signal line through which a sector pulse is transmitted. Numeral 2106 denotes a signal line through which a write gate signal transmitted to the bit-map write control block by the disk control block is transmitted. Numeral 2107 denotes a signal line through which a write gate signal sent from the HDC to the disk drive is transmitted.

In FIG. 12, numeral 2101 denotes a bit-map write control block. Numeral 2301 denotes a sector counter for receiving a sector pulse and counting the number of sectors on the sector pulse. Numeral 2302 denotes a register for holding bit-map data. Numeral 2303 denotes a multiplexer for selecting a bit value corresponding to the sector indicated by the sector count from the bit-map data and outputting the selective bit value. Numeral 2304 denotes a gate for generating an output write gate value from the output value of the multiplexer and the input write gate value.

In FIG. 13, numeral 2401 denotes a bit-map disk read control block. Numeral 2402 denotes a data line through which bit-map data is transmitted. Numeral 2403 denotes a signal line through which a data write strobe signal is transmitted. Numeral 2404 denotes a signal line through which a write enable signal is transmitted. Numeral 2405 denotes a memory control circuit. Numeral 2406 denotes a RAS signal. Numeral 2407 denotes a CAS signal. Numeral 2408 denotes an address register. Numeral 2409 denotes an address decoder. Numeral 2410 denotes a DMA address generating circuit. Numeral 2411 denotes a transfer counter. Numerals 2412 and 2413 each denotes a multiplexer. Numeral 2414 denotes a DMA transfer control block. Numeral 2415 denotes an arbiter circuit. Numeral 2416 denotes an ECC generating circuit. Numeral 2417 denotes an ECC checking circuit. Numeral 2418 denotes a multiplexer. Numeral 2419 denotes a signal line for synchronously controlling data transfer between the HDC 120 and the host interface control block 182.

In FIG. 15, numeral 2401 denotes a bit-map disk read control block. Numeral 2601 denotes a byte counter. Numeral 2602 denotes a block counter. Numeral 2603 denotes a register for holding bit-map data. Numeral 2604 denotes a multiplexer for selecting a bit value indicating a block count value from the bit-map data. Numeral 2605 denotes a signal line. Numerals 2606 and 2607 each denotes a data line.

Next, the description will be directed to the operations of the bit-map disk write control of the HDC 120 and the bit-map disk read control of the DMAC 110.

In FIG. 10, the bit-map write control block 2102 included in the HDC 120 receives the bit-map data used for bit-map write control from the disk control block 2102 on the data line 2104. Further, the bit-map write control block 2102 receives a sector pulse on the signal line 2105 and a write gate signal on the signal line 2106. The bit-map disk write control block 2101 holds the bit-map data in the register 2302. The internal sector counter 2301 counts the total number of sectors indicating what number of the sector being processed are among the continuous sector groups corresponding to the bit-map. When the new bit-map disk write is carried out, the sector count is set to zero. Once the sector pulse is input, the sector count value is incremented by 1.

The multiplexer 2303 outputs the sector counter value and the bit-map data as inputs. Assuming that the bit value for the sector indicated by the sector count value, that is, the sector count value is i, the multiplexer 2303 selects the i-th bit value from the bit-map data and outputs it. The gate 2304 directly outputs the write gate signal received on the signal line 2106 when the output value a of the multiplexer 2303 indicates a write enable state or outputs the write disable signal onto the signal line 2107 when the output value a indicates a write disable signal independently of the value of the write gate signal received on the signal line 2106. The relation between the bit value of the disk-write bit-map and the write gate signal will be shown in FIG. 11.

Next, the description will be directed to the bit-map disk-read control function to be performed by the DMAC 110.

The bit-map disk read control block 2401 in the DMAC 110 receives bit-map data on the data line 2402 and a data write strobe signal on the signal line 2403 and outputs a write enable signal for the disk cache memory on the signal line 2404.

The bit-map disk read control block 2401 holds the bit-map data received on the data line 2402 in the internal register 2603. The internal byte counter 2601 counts the number of completely transferred data bytes in the data block being processed. The block counter 2602 manages the data block being processed among the data block group. The byte counter 2601 increments the counter value each time the data write strobe signal is received on the signal line 2403. The data write strobe signal takes place each time a predetermined number of bytes are written on the disk cache memory 130. When the byte number of one data block is counted, the counter value of the byte counter 2601 is sent to the block counter 2602 on the signal line 2605. In response to the signal for the counter value, the block counter 2602 serves to increment the block counter value by 1. The counter value j in the block counter 2602 indicates that the data block being currently processed is the j-th block in the data block group for which the bit-map disk read control is carried out. The multiplexer 2604 receives a block counter value from the block counter 2602 and the bit-map data from the register 2603 and outputs the write enable signal. Assume that the block counter value is j. The multiplexer selects the j-th bit value of the bit-map data and outputs the selected bit value as a write enable signal onto the signal line 2404.

The write enable signal is output to the disk cache memory 130 as a RAS signal or a CAS signal for controlling the write enable to the disk cache memory 130 through the memory control circuit 2405. The relation between the bit value of the disk read bit-map and the RAS signal will be shown in FIG. 14.

The use of the DMAC 110 and the HDC 120 described above makes it possible to do writing of discontinuous dirty data blocks existing on the disk cache memory 130 to the disk drive or reading of the data from the disk drive to the discontinuous empty data block existing on the disk cache memory through the effect of just one DMA transfer. This simplifies the processing of the micro program 101 provided in the disk controller 80.

By providing the two systems with the combination of the DMAC-HDC in the disk controller, if the dirty data blocks and the empty data blocks discontinuously exist on the continuous areas on the cache memory, it is possible to do writing of the data on the dirty data blocks to the disk and reading of the data on the disk onto the empty data blocks at the same time with one disk rotation by switching the read/write at each block.

Next, the description will be directed to a disk controller 180 provided with a cache according to the second embodiment of the invention as referring to FIGS. 16, 17, 18 and 19. The second embodiment is a transformation of the first embodiment. The afore-mentioned first embodiment has been arranged so that for transferring data on the discontinuous blocks, all the data on the continuous areas containing discontinuous blocks are read out when reading the data and the data is written according to the bit-map when writing the data on the disk drive or the disk cache memory. On the other hand, the second embodiment is arranged so that when reading the data, only the data blocks to be written on the disk drive or the disk cache memory are selected according to the bit-map and read out.

Hereafter, the description will be directed to writing of the data on the discontinuous dirty blocks on the cache segment 131 on the disk drive through one DMA transfer.

Figure 16:
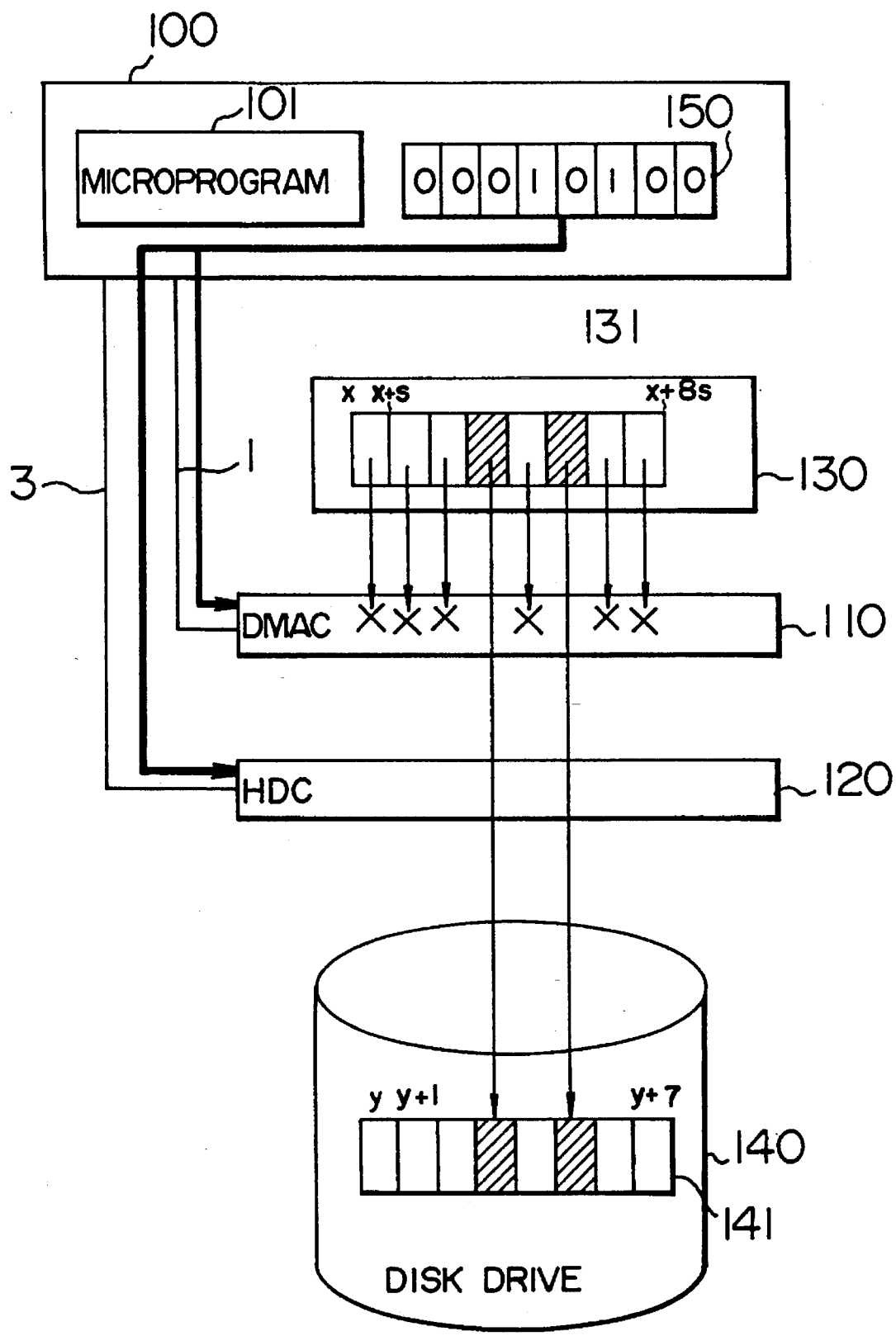
FIG. 16 is a view showing a disk subsystem to which data transfer from a disk cache memory to a disk drive according to a second embodiment of the invention applies.
Figure 17:
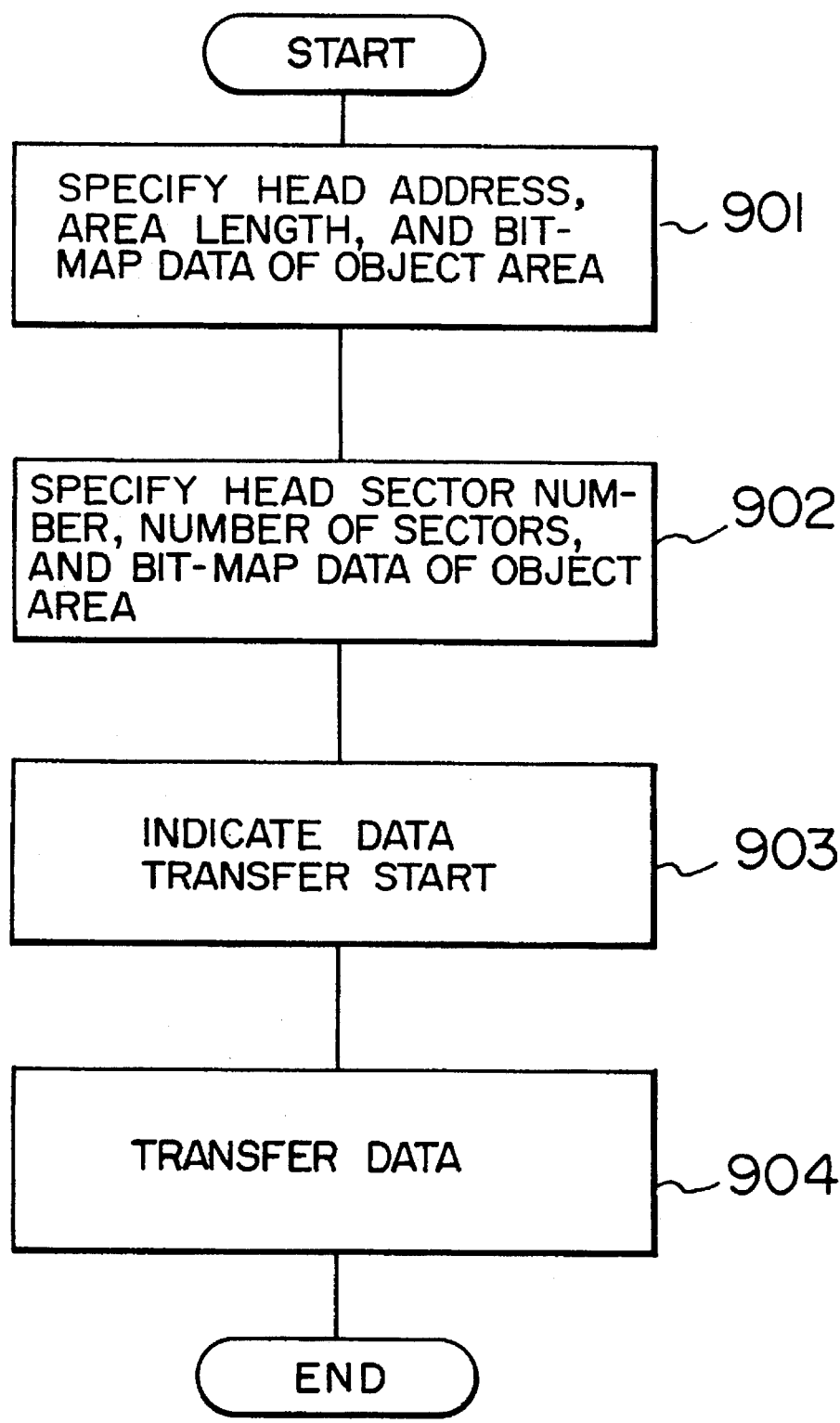
FIG. 17 is a flowchart showing a process of data transfer shown in FIG. 16.
Figure 18:
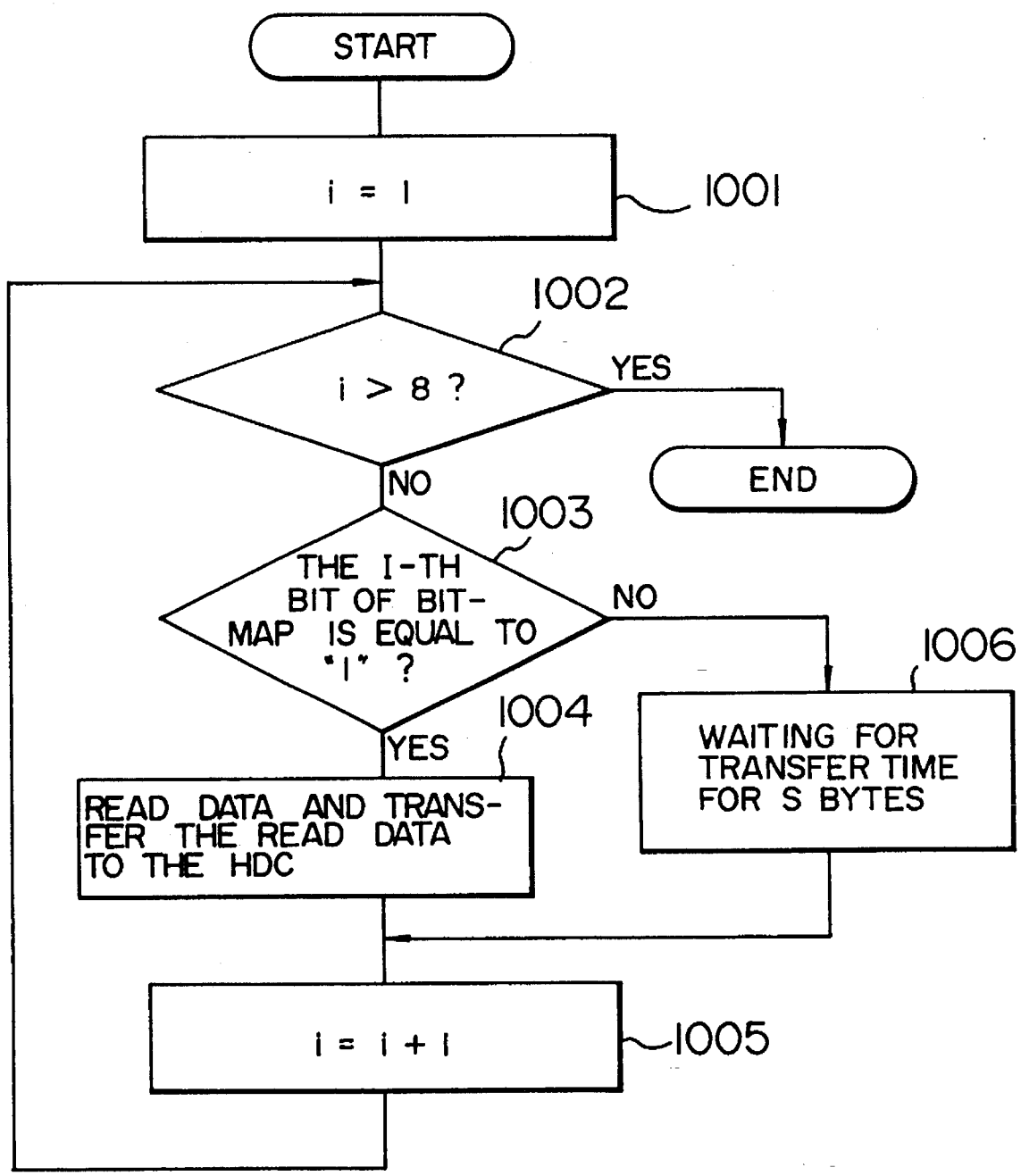
FIG. 18 is a flowchart showing a concrete process of an essential part of the process shown in FIG. 17.
Figure 19:
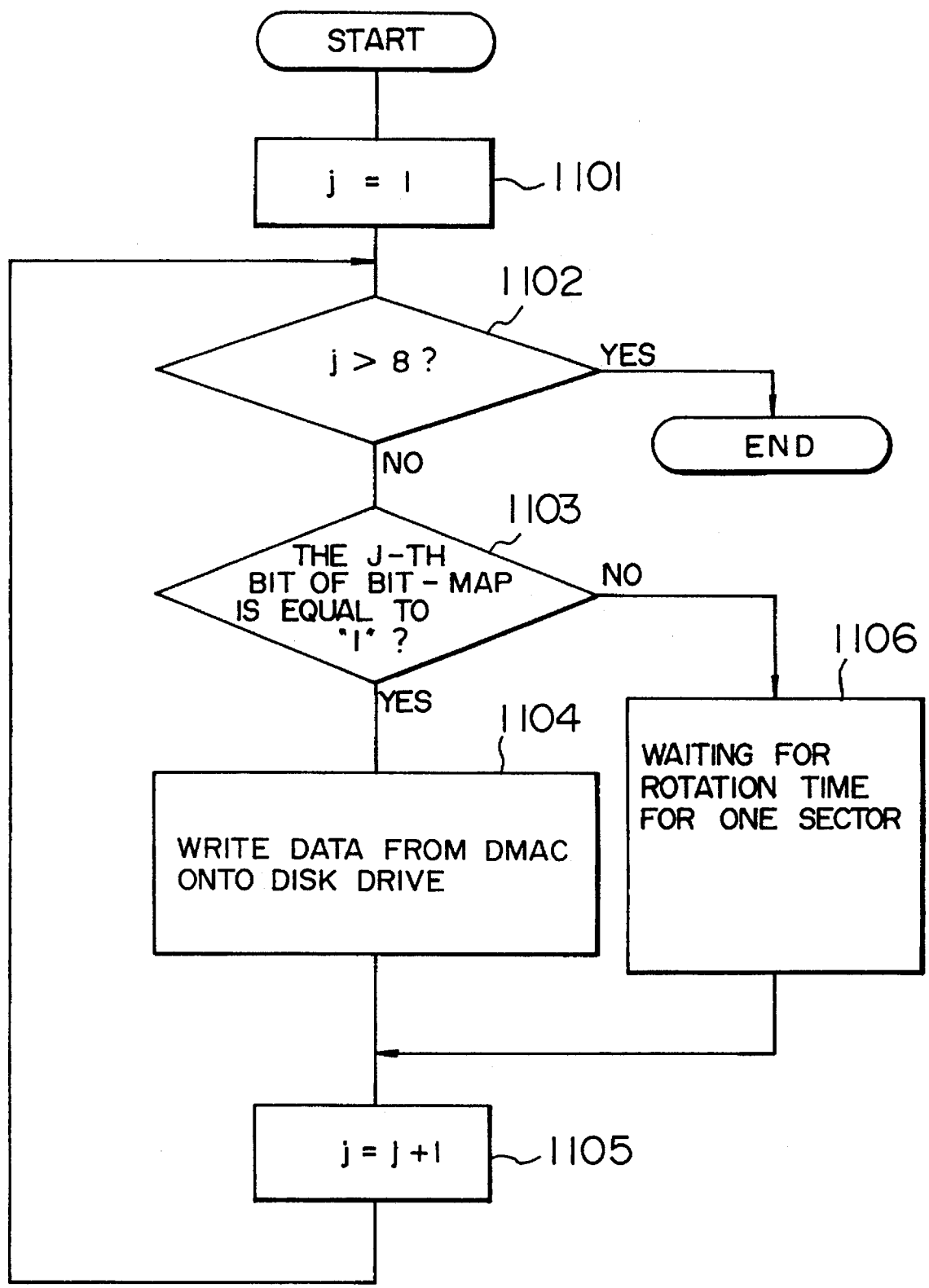
FIG. 19 is a flowchart showing a concrete process of an essential part of the process shown in FIG. 17.

FIG. 16 shows the arrangement of a disk sub-system provided with a cache embodying the present invention and how it operates when data is transferred. FIG. 17 is a view showing a routine for data transfer. FIG. 18 is a flowchart showing the process of the DMAC 110 when transferring data. FIG. 19 is a flowchart showing the process of the HDC 120 when data is transferred. In FIG. 16, numeral 100 denotes a microprocessor. Numeral 110 denotes a DMAC for controlling a cache memory. Numeral 120 denotes a HDC for controlling the disk drive. Numeral 130 denotes a cache memory. Numeral 140 denotes a disk drive. Numerals 1 and 3 each denote a bus for transmitting some kinds of signals such as a control signal. Numeral 101 denotes a micro program. Numeral 150 denotes a disk write bit-map. Numeral 131 denotes a disk cache segment. Numeral 141 denotes a disk segment.

In this embodiment, the size of the cache segment 131, that is, a management unit of the disk cache memory 130, is eight sectors for explanation's convenience. It goes without saying that any number of sector except eight sectors may be effective. The present embodiment will be described with reference to the process of allocating the cache segment 131 to the disk segment 141 inside of the disk drive 140 and writing the data of the fourth and the sixth blocks on the cache segment 131 on the corresponding sectors on the disk. The content "00010100" of the disk write bit-map 150 is control information for inhibiting writing of the data of the data block on the disk cache memory 130 whose bit value is "0" that is, first, second, third, fifth, seventh, and eighth data blocks, totally six data blocks, onto the disk drive or writing the data of the data block on the disk cache memory whose bit value is "1", that is, the fourth and the sixth data blocks onto the corresponding sectors on the disk drive, because the fourth and the sixth data blocks are dirty data blocks.

When transferring the data, the microprocessor 100 specifies in the DMAC 110 the head address x and the area length 8s of the cache segment 131 to which the data is transferred and the content "00010100" of the bit-map 150 through the bus 1. (step 901 in FIG. 17). Next, the microprocessor 100 specifies in the HDC 120 the sector number y and the sector number 8 of the head sector of the disk segment 141 to which the data is transferred and the content of "00010100" through the bus 3 (step 902). Next, the microprocessor 100 specifies in the DMAC 110 and the HDC 120 start of data transfer from the disk cache memory to the disk drive through the buses 1 and 3. Then, the data is transferred through the DMA transfer (step 904).

The DMAC 110 is operated as below according to the flowchart shown in FIG. 18. At the step 1001, a value of "1" is substituted to the internal variable i. Symbol i denotes an internal variable indicating the number of a block being processed. Next, the operation goes to a step 1002 at which lit is determined if i exceeds the number of blocks, eight, inside of the object area. If i>8, the operation is terminated. If i≦8, the operation goes to a step 1003.

At the step 10003, it is determined whether or not the value of the i-th bit of the bit-map is 1. If the value is "1", the operation goes to the step 1004 at which the data of an s-byte block is read on an address x+(i−1) on the disk cache memory and is transferred to the HDC 120. The operation goes to a step 1005. At this step, if the bit value is "0", the operation goes to a step 1006 at which the operation stays in the waiting state until all the data of s bytes is transferred. Then, the operation goes to the step 1005. At this step, a value of i is incremented by 1. Then, the operation jumps to the step 1002.

The HDC 120 operates as described below according to the flowchart shown in FIG. 19. At the step 1101, a value of "1" is substituted for the internal variable j. Symbol j denotes an internal variable indicating the number of a block being processed. Next, the operation goes to a step 1102. At this step, it is determined whether or not j exceeds the number of blocks, eight, in the object area. If j>8, the operation is terminated. If j≦8, the operation goes to a step 1103. At this step, it is determined whether or not a value of the j-the bit on the disk write bit-map 150 is "1". If the value is "1", the operation goes to a step 1104. At this step, the data of the j-th data block on the cache memory sent from the DMAC 110 is written on the sector of the sector y+(i−1). The operation goes to a step 1105. If the bit value is "0", the operation goes to a step 1106. At this step, the operation stays in the waiting state until the disk is rotated by one sector. Then, the operation goes to the step 1105. At this step, a value of i is incremented by 1. Then, the operation jumps to the step 1102.

The above operation makes it possible to write the data of the discontinuous dirty blocks on the cache segment 131 onto the disk through the effect of one DMA transfer.

To read the data from the disk and write it onto the discontinuous empty blocks on the cache segment through the effect of just one DMT transfer, it is just necessary to swap the functions of the DMAC 110 and the HDC 120 with each other. This results in making it possible to do the operation substantially similarly to the above. Hence, the description thereabout will not be descriptive herein.

Next, the description will be directed to a disk subsystem provided with a cache according to a third embodiment of the present invention with reference to FIGS. 20 to 23. The feature of this embodiment is that if a dirty data block(s) not reflected on the disk and an empty data block(s) having no valid data are on the disk cache memory 130 in a discontinuous manner, the swap of the data write from the cache memory to the disk drive with the data read from the disk drive to the cache memory is allowed to be carried out between the adjacent sectors of the disk while the disk held in the disk drive turns once. This feature makes it possible to perform an interactive data transfer between the write of the data on the dirty data blocks discontinuously ranging on the disk cache memory to the disk cache memory and the read of the data on the dirty data blocks discontinuously ranging on the disk cache memory to the disk drive through the effect of one DMA transfer at one time.

The present embodiment is described with reference to a disk segment having a size of six sectors and a cache segment consisting of six data blocks. However, it goes without saying that the present invention is still effective if the number of sectors are more than six. Further, if a plurality of cache segments corresponding to continuous disk segments on the disk drive are discontinuously ranged on the cache memory, the use of the technique such as an auto-load mode described in the afore-mentioned magazine "Interface" makes it possible to realize an interactive data transfer between the disk segments and the cache segments by performing a DMA transfer the same number of times as the number of disk segments.

Figure 20:
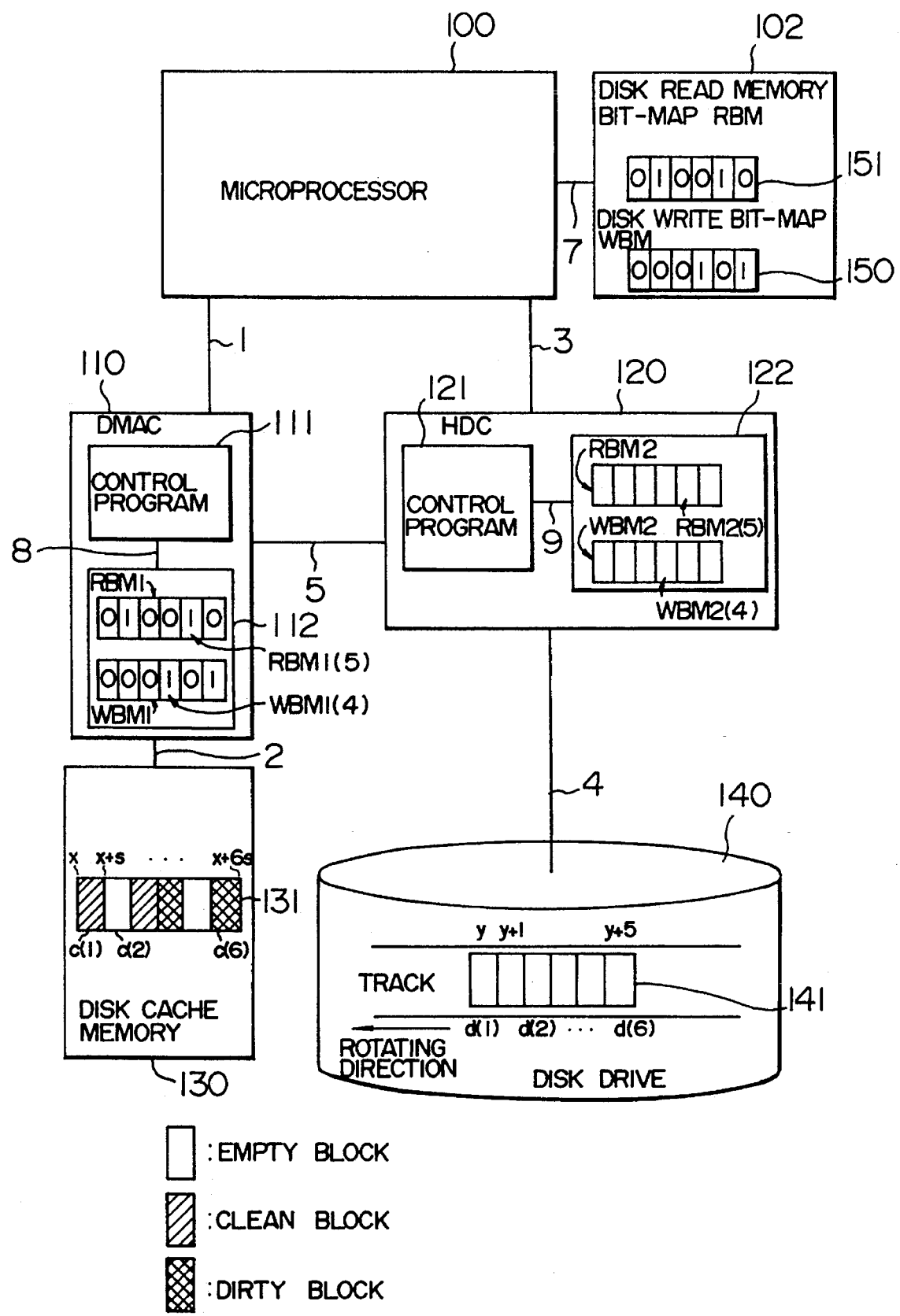
FIG. 20 is a block diagram showing a disk subsystem to which interactive data transfer from a disk cache memory to a disk drive according to a third embodiment of the invention applies.

FIG. 20 is a block diagram showing a disk subsystem provided with a cache to which the present invention applies. In FIG. 20, numeral 102 denotes a memory for storing bit-maps 150 and 151 of the microprocessor 100. Numerals 111 and 112 are a control program and a control memory of the DMAC 110, respectively. RBM1 denotes a read bit-map the DMAC 110 holds in the control memory 112. RBM1(i) denotes an i-th bit value of the RBM 1. WBM1 denotes a write bit-map the DMAC 110 holds in the control memory 112. WBM1(j) denotes an j-th bit value of the WBM1. Numerals 121 and 122 denote a control program and a control memory of the HDC 120, respectively. RBM2 and WBM2 denote a disk read bit-map and a disk write bit-map the HDC 120 holds in the control memory 122, respectively. RBM2(k) and WBM2(l) denote a k-th bit value of the RBM2 and an 1-th bit value of the WBM2. Numeral 131 denotes a cache segment held in the disk cache memory 130. An empty box denotes an empty data block and a hatching box denotes a clean data block. A cross-hatch box denotes a dirty data block. In FIG. 20, numerals 7, 8 and 9 denote buses.

Figure 21:
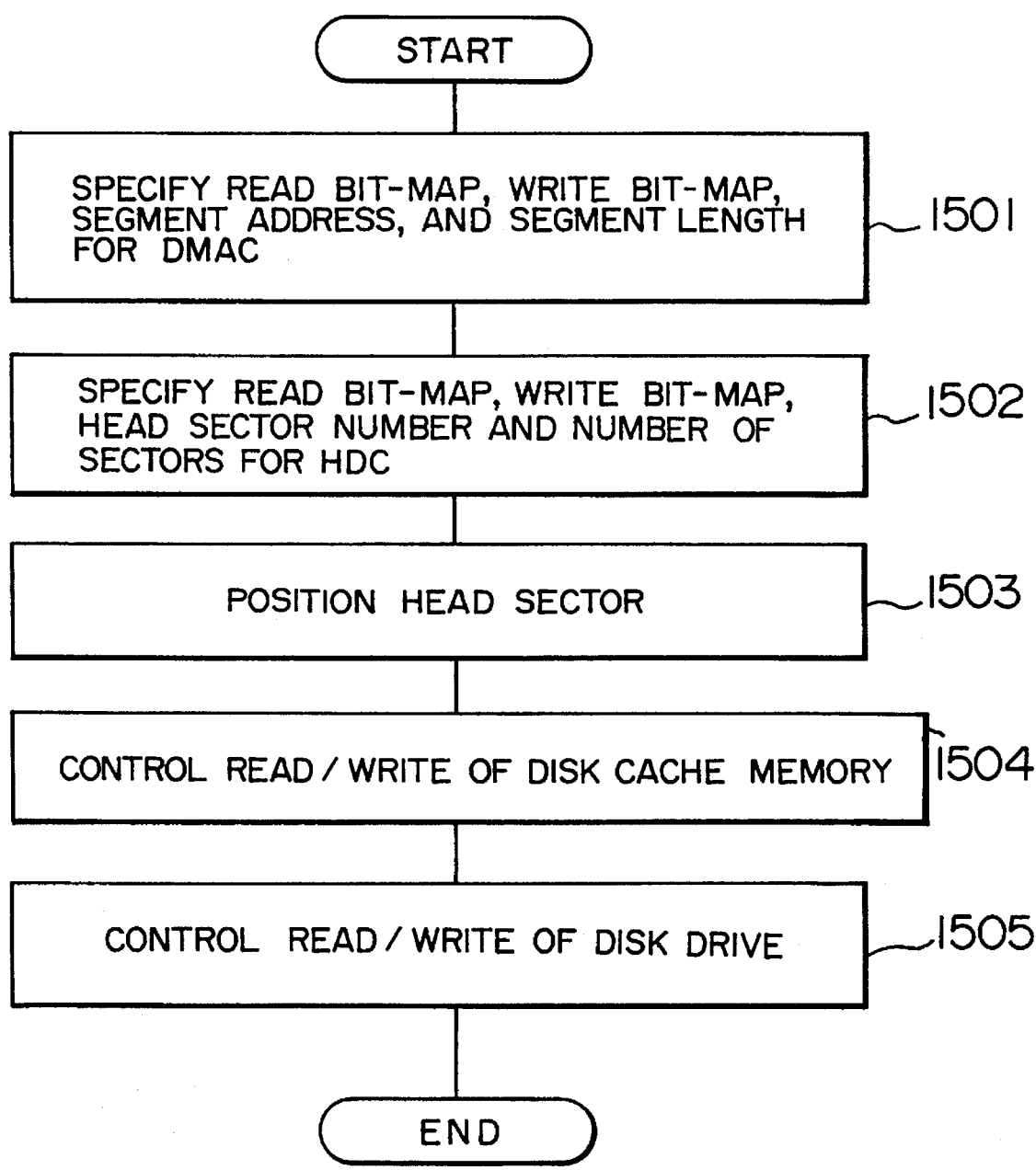
FIG. 21 is a flowchart showing a process of interactively transferring data as shown in FIG. 20.
Figure 22:
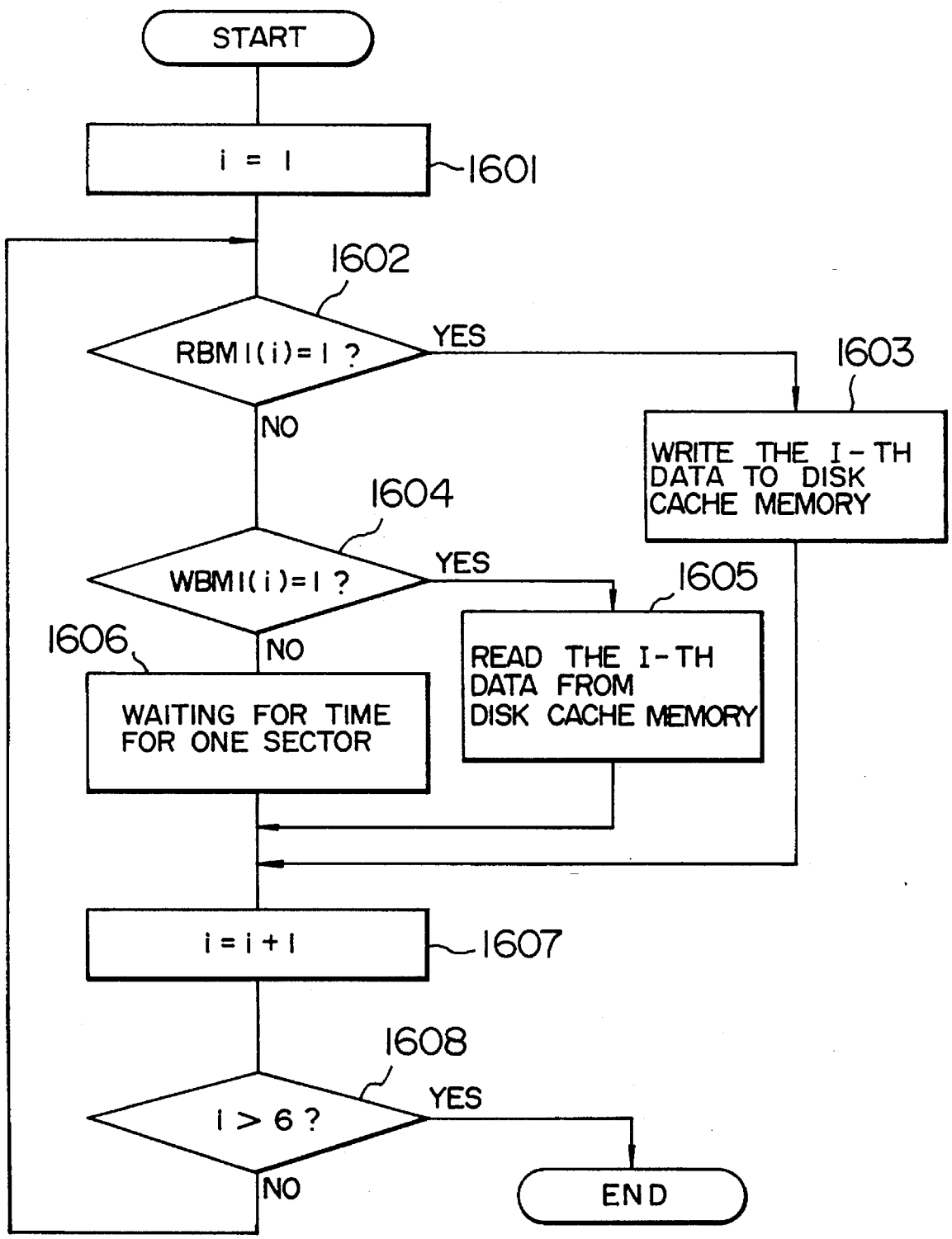
FIG. 22 is a flowchart showing a concrete process to be done by the DMAC shown in FIG. 20 under the process shown in FIG. 21.
Figure 23:
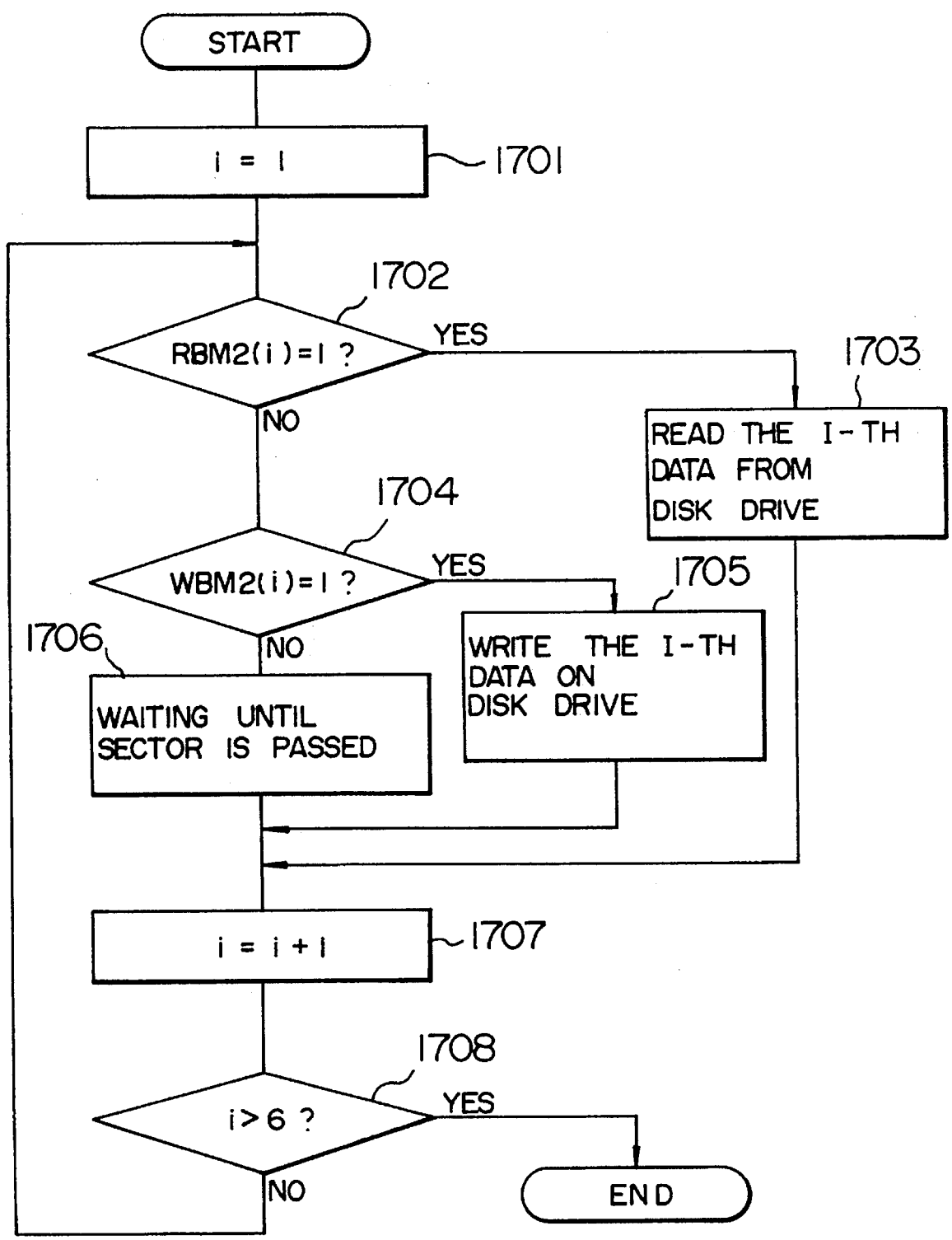
FIG. 23 is a flowchart showing a concrete process to be done by the HDC shown in FIG. 20 under the process shown in FIG. 21.

FIG. 21 is a flowchart showing a series of operations performed by the disk subsystem provided with a cache according to the present embodiment. FIG. 22 is a flowchart showing the processing of the control program 111 of the DMAC 110. FIG. 23 is a flowchart showing the processing of the control program 121 of the HDC 120.

Next, the description will be expanded with reference to FIGS. 20 to 23.

At first, the overall system will be described with reference to FIG. 20. The microprocessor 100 manages the state of the cache segment 131 on the disk cache memory 130 by using the management table in its own memory 102. Herein, in the cache segment 131, the first and the third data blocks are clean data blocks, the second and the fifth data blocks are empty data blocks, and the fourth and the sixth data blocks are dirty data blocks. The microprocessor 100 creates the read bit-map RBM and the write bit-map WBM of the cache segment 131 by using the information of the management table of the cache segment 131. The i-th bit of the RBM corresponds to the i-th data block of the cache segment 131.

When the data block is an empty data block, the corresponding bit value is made to be "1", which indicates that it is necessary to read the data from the disk drive to the data block. The j bit corresponds to the j-th data block of the cache segment 131. When the corresponding data block is a dirty data block, the corresponding bit has a value of "1", which indicates that it is necessary to write the data of the corresponding data block onto the disk. Since the cache segment 131 has the second and the fifth empty data blocks, the second and the fifth bit values of the RBM are made to have a value of "1". Since the cache segment 131 has the fourth and the sixth dirty data blocks, the fourth and the sixth bits of the WBM are made to have a value of "1".

Next, FIG. 21 shows a series of operations. The microprocessor 100 operates to send to the DMAC 110 the read bit-map RBM and the write bit-map WBM of he cache segment 131 and the head address x and the cache segment length 6s bytes of the cache segment 131 (step 1501). Next, the microprocessor 100 operates to send to the HDC 120 the read bit-map RBM and the write bit-map WBM of the cache segment 131 and the head sector number y and the number 6 of sectors in the area of the disk segment 141 on the disk drive corresponding to the cache segment 131 (step 1502). RBM1, WBM1 and RBM2, WBM2 are copies of the RBM and WBM respectively received by the DMAC 110 and the HDC 120 from the microprocessor 100 and held in their own control memories 112 and 122. Next, at the step 1502, the HDC 120 receives the head sector number y of the object area from the microprocessor 100, when the disk drive 140 is positioned to the sector of the sector number y for the head sector of the object area (step 503).

Next, the DMAC 110 and HDC 120 operate according to the flowcharts shown in FIGS. 22 and 23. The operation will be simply described below. The DMAC 110 serves to serially perform an operation of writing the data transferred from the HDC 120 onto the data block, an operation of reading the data of the data block on the cache memory 130 and transferring data onto the HDC 120, and an operation of waiting while the disk turns by one sector as swapping these three operations in synchronism to sector switching of the read/write head in the disk drive 140, according to the read bit-map RBM1 and the write bit-map WBM1 (step 1504). The HDC 120 serves to serially perform an operation of writing the data transferred from the DMAC 110 onto the corresponding sector, an operation of reading the data of the sector on the disk drive 140 and transferring the data to the DMAC 110, and an operation of waiting while the disk turns by one sector as swapping these three operations in synchronism to sector switching of the read/write head according to the read bit-map RBM2 and the write bit-map WBM2 (step 1505).

The operation of the DMAC 110 at the step 1504 will be discussed in detail with reference to FIG. 22. Symbol i denotes an internal variable which stands for the number of a data block being currently processed. At first, at a step 1601, a value of "1" is substituted to i. Then, the operation goes to a step 1602 at which it is determined if the i-th bit of the RBM, RBM1(i) is "1" or "0". If the bit has a value of "1", the operation goes to a step 1603. At this step, the s-byte data on the sector of the sector number y+(i−1) is written on the s-byte area starting from the address x+(i−1)s on the disk cache memory, that is, the i-th data block on the cache segment 131. Then, the operation goes to a step 1607. If, at the step 1602, the RBM1(i) has a value of "0", the operation goes to a step 1604 at which it is determined if the i-th bit of the WBM1, WBM1(i), is "1" or "0". If the bit has a value of "1", the operation goes to a step 1605. At this step, the data is read from the s-byte area starting from the address x+(i−1)s on the cache memory 131, that is, the i-th data block of the cache segment 131 and is transferred to the HDC 120. Then, the operation goes to a step 1607. If, at the step 1604, the WBM1(i) has a value of "0", the operation goes to a step 1606. At this step, the micro program waits until the read/write head passes the sector of the sector number y+(i−1) corresponding to the i-th data block. Then, the operation goes to a step 1607 at which a value of i is incremented by 1. Then, the operation goes to a step 1608. At this step, it is determined if a value of i exceeds the number 6 of the cache blocks in the cache segment 131. If i is larger than 6, the operation is terminated. If i is equal to or less than 6, the operation goes to the step 1602 from which the operation is continued.

The operation of the HDC 120 at the step 1505 will be discussed in detail with reference to FIG. 23. Symbol i denotes an internal variable which stands for the number of a sector being currently processed. At a step 1701, a value of "1" is substituted to i. Then, at a next step 1702, it is determined if the i-th bit of the RBM2, RBM2(i), is "1" or "0". If the bit has a value of "1", the operation goes to a step 1703 at which the s-byte data is read from the sector of the sector number y+(i−1) from the disk driver 140 to the DMAC 110. Then, the operation goes to a step 1707. If, at the step 1702, the bit value is "0", the operation goes to a step 1704 at which it is determined if the i-th bit of the WBM2, WBM2(i), is "1" or "0". If the bit value is "1",the operation goes to a step 1705. At this step, the s-byte data of the i-th data block on the cache segment 131, transferred from the DMAC 110 is written on the sector of the sector number y+(i−1) of the disk drive 140. Then, the operation goes to a step 1707. If, at the step 1704, the bit value is "0", the operation goes to the step 1706. At this step, the micro program waits until the read/write head of the disk drive 140 passes the sector of the sector number y+(i−1). Then, the operation goes to the step 1707. At this step, a value of i is incremented by 1. Then, the operation goes to a step 1708. At this step, it is determined if a value of i exceeds the size of disk segment 141, 6. If i is larger than 6, the operation is terminated. If i is equal to or less than 6, the operation goes to the step 1702 at which the operation is continued.

If the dirty data blocks being or reflected on the disk and the empty data blocks having no valid data are discontinuously ranged on the cache memory, the operation described above makes it possible to perform an interactive data transfer between the write of the data on the dirty data blocks discontinuously ranged on the cache memory onto the disk and the read of the data on the disk into the empty data blocks discontinuously ranged on the cache memory through the effect of one DMA transfer at one time, by switching the data write from the cache memory to the disk drive to the data read from the disk drive to the cache memory.

The effects offered by this embodiment are (a) easier programming of a cache control program for the disk subsystem provided with a cache having a write back function and (b) enhancing an I/O throughput of the disk subsystem provided with the cache because of the concurrent implementation of writing on the disk the data on the dirty data blocks discontinuously ranging on the area on the cache memory, which corresponds to each of the areas continuously ranging on the disk, and of reading the data on the disk into the empty data blocks through the effect of Just one DMA transfer.

This embodiment has used the disk write bit-map and the disk read bit-map. But, it may be implemented by any one of them.

The fourth embodiment of the present invention will be discussed in detail with reference to FIG. 24.

Figure 24:
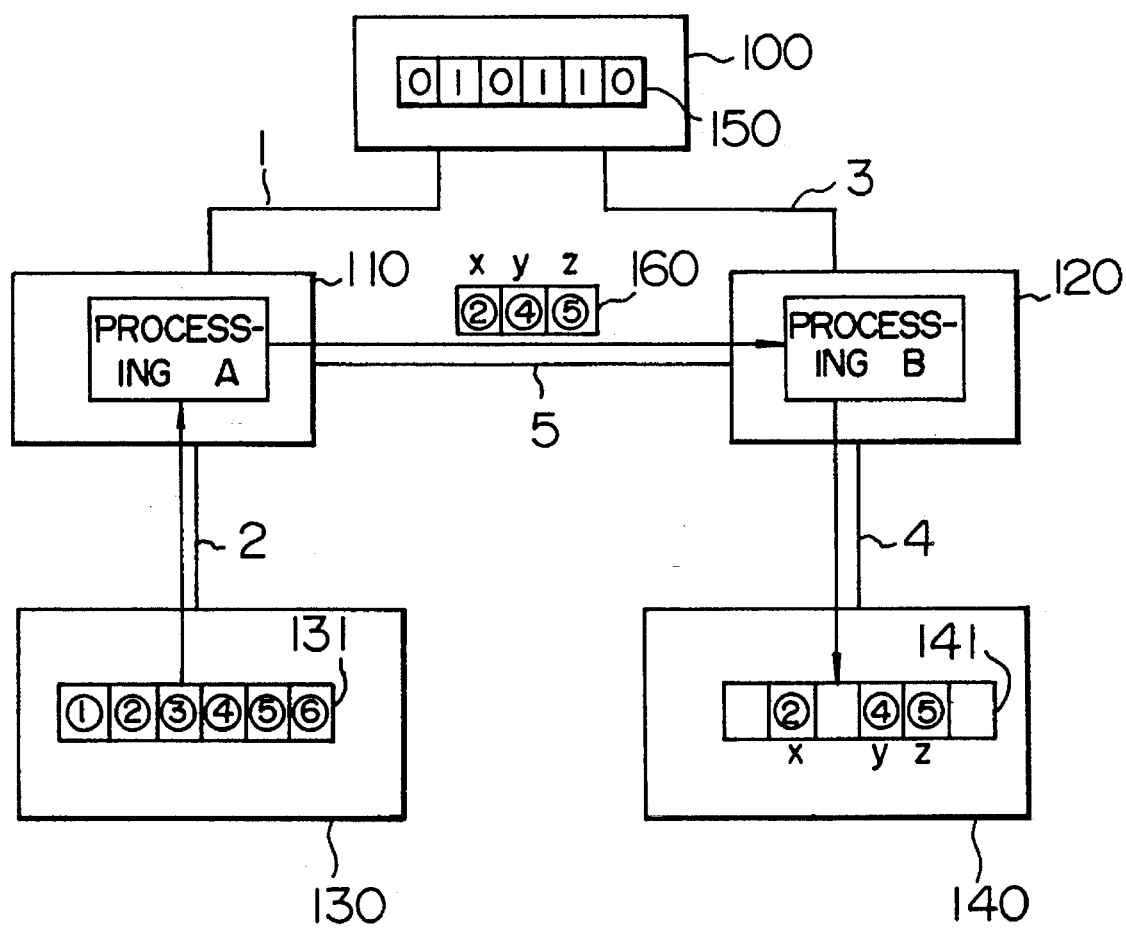
FIG. 24 is a view showing a disk subsystem to which data transfer from a disk cache memory to a disk drive according to a fourth embodiment of the invention applies.

In FIG. 24, numeral 100 denotes a microprocessor. Numeral 110 denotes a DMAC. Numeral 130 denotes a disk cache memory served as a storage unit. Numeral 131 denotes a series of data segments in the disk cache memory 130. Numeral 120 denotes an HDC. Numeral 140 denotes a disk drive. Numeral 141 denotes a disk segment made up of a series of data blocks in the disk drive 140. Numeral 150 denotes a disk write bit-map. Numeral 160 denotes transmission data. Numerals 1 and 3 denote control lines. Numerals 2, 4 and 5 denote buses.

The microprocessor 100 sends the range of the series of data blocks 131 inside of the disk cache memory 130, the content of the disk write bit-map 150, and a data sending start command to the DMAC 110 on the control line 1. Next, the controller 110 executes the processing A. The content of the processing A will be described below. All the data on the series of data blocks 131 is read from the disk cache memory 130 to the DMAC 110. Next, according to the received bit-map information, only the dirty data block(s) is selected from the series of data blocks read from the disk cache memory 130 for creating the transmission data 160. Then, the transmission data 160 is transmitted on the bus 5. In the bit-map information, the i-th bit corresponds to the i-th data block in the series of data blocks. If the bit value is "0", the DMAC 110 discards the value of the corresponding data block among the read data. If the bit value is "1", the controller 110 transmits the value of the corresponding data block among the read data. In the example of FIG. 24, the data blocks are totally six blocks from the data blocks 1 to 6. Since the received bit-map is "010110", the data on the first, the third, and the sixth data blocks are discarded and the transmission data 160 is made up of the data on the second, the fourth and the fifth blocks. The transmission data 160 is sent on the bus 5.

The microprocessor 100 sends a range of the disk segment 141 inside of the disk drive 140, information of the disk write bit-map 150, and a receipt command of data to the HDC 120 on the control line 3. Next, the controller 120 executes the processing B. The content of the processing B is as follows. The controller 120 receives the transmission data 160 sent on the bus 5. Then, according to the received bit-map information, the data block in the received data is written on the data block on the disk segment 141 through the bus 4. The i-th bit of the bit-map information corresponds to the i-th data block of the disk segment 141 consisting of serial blocks. The j-th data block in the received data is written on the data block for the j-th "1" appearing in the bit-map. In FIG. 24, the disk segment 141 consists of six continuous blocks. The received data consists of three data blocks xyz. Since the received bit map is "010110", the first data block x, the second data block y and the third data block z in the received data correspond to the second block, the fourth block and the fifth block in the disk segment 141, respectively.

As such, the transfer of discontinuous data blocks is allowed to be carried out if the microprocessor 100 indicates it to the DMAC 110 and the HDC 120 just once. The present embodiment is more advantageous in reducing the amount of data passing through the bus 5 than the previous embodiment. In addition, by replacing the role of the DMAC 110 with that of the HDC 120, it is possible to transfer discontinuous data segments from the disk drive 140 to the disk segment 130 in a condensed manner according to the substantially similar procedure. Hence, the description thereabout is left out herein.

According to the present invention, the data of discontinuous dirty data blocks on the disk cache memory is allowed to be written on the disk through the effect of one DMA transfer as considering the characteristics of the disk. In the transfer operation, an amount of memory and overhead are made smaller and the used program is made simpler. The arrangement according to the invention makes it possible to improve the performance of the disk subsystem provided with a cache employing a write-back system, to reduce the overhead of the control program (microprogram) and to facilitate description of the control program.

According to the present invention, the data on the disk is allowed to be read into the discontinuous dirty data blocks on the disk cache memory through the effect of one DMA transfer as considering the characteristics of the disk. In the transfer operation, an amount of memory and overhead are made smaller and the used program is made simpler. The arrangement according to the invention makes it possible to improve the performance of the disk subsystem provided with a cache employing a write-back system, to reduce the overhead of the control program and to facilitate description of the control program.

Further, the present invention provides a capability of executing the writing of the data of discontinuous dirty data blocks on the disk cache memory into the disk and the reading of the data on the disk into discontinuous empty data blocks on the cache memory exclusively related with the dirty data blocks at one time. Hence, it is possible to greatly enhance the performance of the disk subsystem provided with a cache employing a write-back system, to reduce the overhead of the control program and to facilitate description of the control program.

We claim:

1. A data transfer method for transferring data of discontinuous storage blocks in a first storage area consisting of a plurality of continuous storage blocks in a first storage unit and data of discontinuous storage blocks in a second storage area consisting of a plurality of continuous storage blocks between said first and said second storage units interactively, said plurality of storage blocks in said first storage area corresponding to said plurality of storage blocks in said second storage area, respectively, said data transfer method comprising the steps of:

creating a first bit-map having a plurality of bit locations for said plurality of continuous storage blocks inside of the first storage area and setting a predetermined bit value to the bit locations for discontinuous storage blocks the data of which is to be transferred from said first storage unit to said second storage unit;

creating a second bit-map having a plurality of bit locations corresponding to said plurality of storage blocks in said second storage area and setting a predetermined bit value to the bit locations for discontinuous storage blocks the data of which is to be transferred to said first storage unit from said second storage unit;

reading said plurality of continuous storage blocks from said first storage area by first control means;

selectively writing said discontinuous storage blocks the data of which is to be transferred to said second storage unit, selected from said read storage blocks, into the corresponding discontinuous storage blocks of said second storage area in said second storage unit by second control means, based on the content of said first bit-map;

selectively reading said discontinuous storage blocks the data of which is to be transferred to said first storage unit, from said second storage area, based on the content of said second bit-map, by said second control means;

writing said selectively read discontinuous storage blocks the data of which is to be transferred to said first storage unit onto the corresponding discontinuous storage blocks to said first storage area in said first storage unit by means of first control means, based on the content of said second bit-map;

wherein the data transfer of said discontinuous storage blocks is allowed between said first and said second storage units through the effect of one data transfer start.

2. A data transfer method as claimed in claim 1, wherein said first and second storage units are a disk cache memory and a disk drive, respectively, said first and second storage areas are a cache segment and a disk segment, respectively, and said first and second control means are a DMAC and an HDC, respectively.

3. A disk controller being connected to a host computer, comprising:

a disk cache memory having a cache segment made up of a plurality of continuous data blocks;

a disk drive having a disk segment made up of a plurality of continuous data blocks, the plurality of continuous data blocks in said cache segment corresponding to a plurality of continuous data blocks in said disk segment, respectively;

a disk write bit-map having a plurality of bit locations corresponding to the plurality of continuous data blocks in said cache segment, a predetermined bit value being set to the bit locations corresponding to discontinuous data blocks the data of which is to be transferred;

a disk read bit-map having a plurality of bit locations corresponding to the plurality of continuous data blocks in said disk segment, a predetermined bit value being set to the bit locations corresponding to discontinuous data blocks the data of which is to be transferred;

a DMAC for reading said plurality of continuous data blocks from said cache segment;

an HDC for writing said discontinuous data blocks the data of which is to be transferred to said disk drive, selected from the plurality of said data blocks, into the corresponding discontinuous data blocks of said disk segment of said disk drive, based on the content of said disk write bit-map and selectively reading said discontinuous data blocks the data of which is to be transferred to said disk cache memory from said disk segment, base on the content of said disk read bit-map; and wherein said selectively read discontinuous data blocks the data of which is to be transferred to said disk cache memory are written on the corresponding discontinuous data blocks of said cache segment of said disk cache memory by means of first control means, based on the content of said disk read bit-map, in a manner that data transfer of said discontinuous data blocks is allowed interactively between said first control means and said disk drive through the effect of just one data transfer start.

4. A data transfer method to be executed for a disk controller connected to a host computer, comprising the steps of:

allocating a cache segment made up of a plurality of continuous data blocks to a disk cache memory in response to a data write request from said host computer;

creating a disk write bit-map corresponding to said cache segment, said disk write bit-map having a plurality of bit locations corresponding to a plurality of continuous data blocks in said cache segment;

writing at least one data block the data of which is to be transferred from said host computer to said cache segment;

setting a predetermined bit value to the bit location corresponding to at least one data block the data of which is to be transferred from said host computer, in said disk write bit-map; and writing at least one data block the data of which is to be transferred on the corresponding data block to the disk segment for said cache segment in said disk drive, based on the content of said disk write bit-map.

5. A data transfer method as claimed in claim 4, further comprising the steps of:

creating a disk read bit-map for said disk segment, said disk read bit-map having a plurality of bit locations corresponding to the plurality of data blocks in said disk segment, respectively;

setting a predetermined bit value to a bit location corresponding to at least one data block the data of which is to be transferred from said disk drive to said disk cache memory data, in said disk read bit-map; and reading at least one data block the data of which is to be transferred from said disk segment, based on the content of said disk read bit-map, in response to a data read request from said host computer, and selectively writing the read data on the corresponding data block on said cache segment.

6. A data transfer method, for use in a disk subsystem having a plurality of storage units, said storage units including a first storage unit in the form of a cache memory and a second storage unit in the form of a disk drive, said first storage unit having a first storage area made up of a plurality of continuous storage blocks and said second storage unit having a second storage area made up of a plurality of continuous storage blocks, said blocks of said first storage area corresponding to said blocks of said second storage area, respectively, said data transfer method comprising the steps of:

transferring data of a plurality of discontinuous storage blocks in said first storage area into the corresponding storage blocks in said second storage area;

reading the overall data of said first storage area from said first storage unit to said second storage unit using first control means; and receiving in second control means control information indicating a storage block the data of which is to be transferred and the overall data of said first storage area from said first control means, determining whether or not the received data block is that storage block the data of which is to be transferred based on said control information, and controlling the writing of the data of the received block into the corresponding area of said second storage area;

wherein data transfer of discontinuous blocks is allowed through the effect of just one data transfer start; and wherein said second control means is an HDC (Hard disk Controller) having as an input a bit-map indicating a head sector number of an area on the disk, a number of sectors on said area, and a sector where the data is written in said area and being controlled so that if a bit value of the bit-map for each sector indicates the write of data, the data for said sector transferred from the cache memory is written in said sector, if the bit value does not indicate the write of data, the data for said sector transferred from said cache memory is stopped, and a read/write head is controlled to wait until it passes said sector.

7. A data transfer method, for use in a disk subsystem provided with a cache, for effecting data transfer between a plurality of storage units, said storage units having a first storage unit in the form of a cache memory and a second storage unit in the form of a disk drive, said first storage unit having a first storage area made up of a plurality of continuous storage blocks and said second storage unit having a second storage area made up of a plurality of continuous storage blocks, said blocks of said first storage area corresponding to said blocks of said second storage are at respectively, said data transfer method comprising the steps of:

transferring data of a plurality of discontinuous storage blocks in said first storage area into the corresponding storage blocks in said second storage area;

reading the overall data of said first storage area from said first storage unit to said second storage unit using first control means; and receiving in second control means control information indicating a storage block the data of which is to be transferred and the overall of said first storage area from said first control means, determining whether or not the received data block is that storage block the data of which is to be transferred based on said control information, and controlling the writing of the data of the received block into the corresponding area of said second storage area;

wherein data transfer of discontinuous blocks is allowed through the effect of just one data transfer start; and wherein said second control means is a direct memory access controller having an input a bit-map indicating a head address of an area on said cache memory, a length, and a block on the cache memory the data of which is to be transferred in said area and controlled so that if a bit value of the bit-map for each block in said area indicates the write of the data, the data of the sector for said block transferred from said disk drive is stopped, if said bit value does not indicate the write of the data, a read/write head of the disk is controlled to wait until it passes the sector for said block on the side of said disk drive.

8. A data transfer method as claimed in claim 6 or claim 7, wherein the storage block to be transferred in the storage area is specified by a bit-map.

9. A data transfer method as claimed in claim 6 or claim 7, wherein the plurality of storage areas in said first storage unit correspond to the plurality of storage areas in said second storage unit in a vis-a-vis relation, continuous data transfer is allowed against the plurality of storage areas by always specifying the next storage area to be transferred of said first storage area, said second storage area, and the storage block the data of which is to be transferred in said first storage area.

10. A data transfer method as claimed in claim 6 or claim 7, wherein if the storage area represents a one-dimensional array of storage blocks, and the storage block to be transferred is specified by a set of pairs of head locations of continuous blocks to be transferred and block numbers thereof.

11. A data transfer method implemented between a plurality of storage units having a first storage unit and a second storage unit, said first storage unit having a first storage area made up of a plurality of continuous storage blocks and said second storage unit having a second storage area made up of a plurality of continuous storage blocks, the storage blocks of said first storage area corresponding to those of said second storage area in a vis-a-vis relation, said data transfer method comprising the steps of:

transferring data of a plurality of discontinuous storage blocks in said first storage area into the corresponding storage blocks in said second storage area;

having first control means for receiving control information indicating a storage block the data of which is to be transferred in said first storage area, selectively reading only the data on said plurality of discontinuous storage blocks from the first storage area into the corresponding storage blocks in said second storage unit; and having second control means for receiving control information indicating a storage block to be transferred in said storage area, receiving the data of the plurality of discontinuous storage blocks in said first storage area from said first control means, controlling the received data to write said data to the corresponding area of said second storage area based on said control information;

wherein data transfer of discontinuous blocks is allowed through the effect of just one data transfer start.

12. A data transfer method as claimed in claim 11, wherein said method is applied to a disk subsystem provided with a cache, said first storage unit is a cache memory, said second storage unit is a disk drive, said first control means is a DMAC controlled to receive a bit-map indicating a head address of an area of said cache memory, an area length of said area, and a block to be written on the disk on said cache memory, if a bit value of said bit-map for each block in the area of said cache memory indicates the write of the data to the corresponding sector, read the data of said block from said cache memory and transfer the read data to said disk drive, if said bit value does not indicate the write of the data to the corresponding sector, wait for a disk rotation time for one sector without transferring the data of said block to said disk drive, and said second control means is an HDC controlled to receive a bit-map indicating a head sector number of an area on said disk, a number of sectors inside of said area, a sector where the data in said area is to be written, if a bit value in the bit-map for each sector in the area of said disk indicates the write of the data to said sector, write in said sector the data of the block for said sector transferred from said cache memory, if said bit value indicates the write of the data for said sector, control a read/write head to pass said sector without doing anything.

13. A data transfer method as claimed in claim 11, wherein said method is applied to a disk subsystem provided with a cache, said first storage unit is a disk drive, said second storage unit is a cache memory, and said first control means is an HDC having as an input a bit-map indicating a head sector number of an area on said disk, a number of sectors in said area and a bit-map for discontinuous blocks on said cache memory and controlled so that for each sector of the area on said disk, if a bit value of the bit-map for each sector indicates the write of the data to the block on the corresponding cache memory to said sector, data is read from said sector and is transferred to said cache memory, if said bit value does not indicate the write of the data to a block on said cache memory, without transferring the data of said sector to said cache memory, a read/write head of said disk is controlled to wait until it passes said sector without doing anything, and said second control means is a DMAC arranged so that said input data is a bit-map indicating a head address of an area on said cache memory, the length of said area, and a block where the data of the area on said cache memory, for each block of the area on said cache memory, said second control means is a DMAC controlled so that if a bit value of the bit-map for the block indicates the write of the data into said block, the data of the sector for said block transferred from said disk drive is written in said block, if said bit value does not indicate the write of the data into said block, without doing anything, the DMAC is controlled to wait for a disk rotation time for one sector.

14. A data transfer device having write control means for controlling writing of data to a storage unit to which data is transferred, said write control means having an address to which a head block of continuous data blocks is written, an interface for specifying control information indicating a set of data blocks of said continuous data blocks which are to be written to said real storage unit, a write gate for controlling whether or not each data block is written in said storage unit, said write control means operating to receive a series of data blocks in response to a write start signal, determine whether or not each data block is data to be written in a real storage unit, based on said control information, control said write gate to write said received data in said storage unit if the data is the real data to be written in the storage unit and not write the received data in said storage unit if the data is not the data written in said storage unit, wherein data transfer of said discontinuous blocks is allowed for the effect of just one data transfer start.

15. A data transfer device as claimed in claim 14, wherein said device is applied to a disk subsystem provided with a cache, said write control means is an HDC being arranged so that said input data is a bit-map indicating a head sector number of an area on said disk, a number of sectors inside of said area, and a sector where data is to be written in said area, it is determined whether or not the data transferred from said cache memory is the data to be written in the sector of the area on said disk according to said bit value of the input bit-map.

16. A data transfer device as claimed in claim 14, wherein said device is applied to a disk subsystem provided with a cache, in which said write control means is a DMAC arranged so as to receive a bit-map indicating a head address of an area on said cache memory, a length of said area, and a block of said area on the cache memory to which data is to be written and control to determine if the data transferred from said disk drive is written in the block on said cache memory according to the bit value of said bit-map.

17. A data transfer method, for use in a disk subsystem provided with a cache, for transfer of data between a plurality of storage units having a first storage unit in the form of a cache memory and a second storage unit in the form of a disk drive, said first storage unit having a first storage area made up of continuous storage blocks and said second storage unit having a second storage area made up of continuous storage blocks, the storage blocks of said first storage area corresponding to those of said second storage area in a vis-a-vis relation, said data transfer involving transferring data of a first group of discontinuous storage blocks in said first storage area into the storage block for said second storage area and transferring data of a second group of discontinuous storage blocks exclusively related with said first group of storage blocks in said second storage area into the storage block for said first storage area, said transfer method comprising the steps of:

controlling said first storage unit by first control means;

controlling said second storage unit by second control means;

receiving control information for specifying if each block inside of the storage area is to be transferred from the first storage area to the second storage area or transferred from the second storage area to the first storage area or to be left intact;

if the control information indicates data transfer from said first to second storage area, said first control means operating to read data of said block from said first storage unit and transfer said data to said second control means, and said second control means operating to writing said transferred data in the corresponding block in said second storage unit;

if the control information indicates data transfer from said second to said first storage area, said second control means operating to read data of the corresponding block from said second storage unit and transfer said data to said first storage unit, said first control means operating to write said transferred data in the corresponding block of said first storage unit; and if the control information indicates the block is to be left intact, said first and second control means operating to inhibit writing of data to said first and second storage units;

wherein interactive data transfer of two discontinuous blocks exclusively related with each other is executed at one time in response to one data transfer start; and wherein said first control means is a disc controller arranged to receive a first bit-map indicating head sector numbers of continuous areas on said disk drive, a number of sectors in each of said areas, and a sector where data is to be written and a second bit-map indicating a sector exclusively related with said sector and from which data is to be read, and further comprising the steps of, if said first bit-map indicates the write of data on the sector, writing data of the corresponding block to said sector transferred from said cache memory in said sector, if said second bit-map indicates the read of data in the sector, reading data of said sector from said disk and transfer said data to said cache memory, if the first and the second bit-maps indicates no read and write of the data on a sector, waiting for a disk rotation time for one sector without having to read or write data from said sector and passing a read/write head of said disk along said sector; and wherein said second control means is a direct memory access controller arranged to receive a third bit-map indicating head addresses of continuous areas on said cache memory corresponding to said continuous areas on said disk drive, an area length, and a block of said area from which data is to be read and being equal to said first bit-map, a fourth bit-map indicating a block of said area to which data is to be written and being equal to said second bit-map, according to the input third and the fourth bit-maps, and further comprising the step of, if said third bit-map indicates reading of data from the block, transferring the data of said block from said cache memory into said disk drive, if the fourth bit-map indicates the writing of data into the block, writing the data of the corresponding sector to said block transferred from said disk drive into said block, if the third and the fourth bit-maps indicate no reading and writing of data to the block, waiting for a disk rotation time for one sector without reading or writing data on said block, and waiting for passage of a read/write head along the sector for said block.

18. A data transfer device comprising:

an HDC controlled to receive a first bit-map indicating head sector numbers of continuous areas on a disk drive, a number of sectors in each area, and a sector of the area on which data is to be written and a second bit-map indicating a sector of the area being exclusively related with said sector and from which data is to be read, if the first bit-map indicates the writing of data on the sector, write data of the corresponding block to said sector transferred from a cache memory in said sector, if the second bit-map indicates the reading of data on the sector, read data of said sector from the disk and transfer the read data to the cache memory, if both of the first and the second bit-maps indicate no reading and writing of data to the sector, wait for a disk rotation time for one sector without reading or writing data on the sector so that a read/write head may pass said sector; and a DMAC controlled to receive a third bit-map indicating head addresses of continuous areas on a cache memory corresponding to said continuous areas on the disk drive, each area length, a block of one area from which data is to be read, said third bit-map being equal to said first bit-map, and a fourth bit-map indicating a block of one area to which data is to be written, said fourth bit-map being equal to said second bit-map, according to the input third and fourth bit-maps, if the third bit-map indicates reading of data to a block, read data of said block from the cache memory and transfer said read data to a disk drive, if the fourth bit-map indicates writing of data in said block, write data of the corresponding sector to said block transferred from said disk drive into said block, if both of the third and the fourth bit-maps indicate no reading and writing of data to the block, wait for a disk rotation time for one sector without reading and writing the data to said block so that a read/write head may pass the sector corresponding to said block.

19. A control block circuit arranged to receive a bit-map data for specifying a write enable or disable to continuous sectors on a disk, a sector pulse generated when sectors are switched, and a write gate signal to the disk, and have a sector counter for counting the number of the sector being currently processed among said continuous sectors on the input of the sector pulse, a register for holding said bit-map data, a multiplexer, and a gate and to output a write gate signal, comprising:

said multiplexer for selecting a bit value of bit-map data of said register corresponding to the count value of said sector counter, outputting said selected bit value to said gate; and said gate for outputting said input write gate signal as it is if the input from the multiplexer indicates a write enable and for outputting a write gate disable signal independently of said input write gate signal if the input indicates a write disable;

wherein data is written to the corresponding sector of said sector group in said continuous sectors on the disk and no data is written to the sectors except said sector group.

20. A hard disk controller having a control block circuit as claimed in claim 19.

21. A control block circuit comprising:

a byte counter for receiving a data write strobe signal generated each time a predetermined number of bytes of bit-map data for specifying a write enable or disable to a plurality of continuous blocks on a cache memory are written to said cache memory and for counting a total number of bytes in an area on the cache memory being currently processed based on said data write strobe signal, said byte counter operating to generate a signal each time the byte counter value reaches a predetermined number of bytes for one block;

a block counter for counting the block number of an area being currently processed among a plurality of blocks on said cache memory, in response to said signal generated by said byte counter; and a register for holding the input bit-map data;

a multiplexer for selecting a bit value of bit-map data in said register, said bit value corresponding to the counter value of said one block, and outputting it as a write enable signal;

wherein data is written to said one block among the plurality of continuous blocks on said cache memory and no data is written to blocks except said one block.

22. A direct memory access controller having a control block circuit as claimed in claim 21.

23. A data transfer method in a disk subsystem with a cache memory for transferring from said cache memory discontinuous data blocks of a cache segment consisting of continuous data blocks to corresponding discontinuous data blocks of a disk segment consisting of continuous data blocks in a disk drive in a one-time read operation of said cache segment without destroying the contents of data blocks other than said corresponding discontinuous data blocks of said disk segment, comprising the steps of:

creating a bit-map having a plurality of bit locations corresponding to the continuous data blocks of said cache segment, respectively, and setting a predetermined bit state to each of the bit locations in said bit-map corresponding to the discontinuous data blocks of said cache segment and another bit state to each of the bit locations in said bit-map corresponding to remaining data blocks other than the discontinuous data blocks of said cache segment;

reading the data blocks of said cache segment from said cache memory using a direct memory access controller; and writing the discontinuous data blocks of said cache segment thus read onto corresponding discontinuous data blocks of said disk segment using a disc controller, while not performing a write operation of the remaining data blocks of said cache segment thus read onto corresponding data blocks of said disk segment, on the basis of the contents of said bit map.

24. A data transfer method as claimed in claim 23, wherein in said reading step, said direct memory access controller reads the discontinuous data blocks of said cache segment, while not performing a read operation on the remaining data blocks of said cache segment, on the basis of the contents of said bit map.

25. A data transfer method in a disk subsystem with a cache memory for transferring from a disk drive discontinuous data blocks of a disk segment consisting of continuous data blocks to corresponding discontinuous data blocks of a cache segment consisting of continuous data blocks in said cache memory in a one-time read operation of said disk segment without destroying the contents of data blocks other than said corresponding discontinuous data blocks of said cache segment, comprising the steps of:

creating a bit-map having a plurality of bit locations corresponding to the continuous data blocks of said disk segment, respectively, and setting a predetermined bit state to each of the bit locations in said bit-map corresponding to the discontinuous data blocks of said disk segment and another bit state to each of the bit locations in said bit-map corresponding to remaining data blocks other than the discontinuous data blocks of said disk segment;

reading the continuous data blocks of said disk segment from said disk drive using a disc controller; and writing the discontinuous data blocks of said disk segment thus read onto corresponding discontinuous data blocks of said cache segment using a direct memory access controller, while not performing a write operation on the remaining data blocks of said disk segment thus read onto corresponding data blocks of said cache segment, on the basis of the contents of said bit-map.

26. A data transfer method as claimed in claim 25, wherein in said reading step, said disc controller reads the discontinuous data blocks of said disk segment, while not performing read operation of the remaining data blocks of said disk segment, on the basis of contents of said bit-map.

27. A disk subsystem with a cache memory wherein discontinuous data blocks of a cache segment consisting of continuous data blocks are transferred from said cache memory to corresponding discontinuous data blocks of a disk segment consisting of continuous data blocks in a disk drive in a one-time read operation of said cache segment without destroying the contents of data blocks other than said corresponding discontinuous data blocks of said disk segment, comprising:

a bit-map having a plurality of bit locations corresponding to the continuous data blocks of said cache segment, respectively, a predetermined bit state being set to each of the bit locations in said bit-map corresponding to the discontinuous data blocks of said cache segment and another bit state being set to each of the bit locations in said bit-map corresponding to remaining data blocks other than the discontinuous data blocks of said cache segment;

a direct memory access controller for reading the data blocks of said cache segment from said cache memory; and a disk controller for writing the discontinuous data blocks of said cache segment thus read onto corresponding discontinuous data blocks of said disk segment, while not performing write operation of the remaining data blocks of said cache segment, on the basis of contents of said bit map.

28. A disk subsystem as claimed in claim 27, wherein said direct memory access controller reads the discontinuous data blocks of said cache segment, while not performing a read operation on the remaining data blocks of said cache segment, on the basis of the contents of said bit map.

29. A disk subsystem with a cache memory wherein discontinuous data blocks of a disk segment consisting of continuous data blocks are transferred from a disk drive to corresponding discontinuous data blocks of a cache segment consisting of continuous data blocks in said cache memory in a one-time read operation of disk segment without destroying the contents of data blocks other than said corresponding discontinuous data blocks of said cache segment, comprising:

a bit-map having a plurality of bit locations corresponding to the continuous data blocks of said disk segment, respectively, and a predetermined bit state being set to each of the bit locations in said bit-map corresponding to the discontinuous data blocks of said disk segment and another bit state being set to each of the bit locations in said bit-map corresponding to remaining data blocks other than the discontinuous data blocks of said disk segment;

a disc controller for reading the continuous data blocks of said disk segment from said disk drive; and a direct memory access controller for writing the discontinuous data blocks of said disk segment thus read onto corresponding discontinuous data blocks of said cache segment, while not performing a write operation of the remaining data blocks of said disk segment thus read onto corresponding data blocks of said cache segment, on the basis of the contents of said bit-map.

30. A disk subsystem as claimed in claim 29, wherein said disc controller reads the discontinuous data blocks of said disk segment, while not performing a read operation on the remaining data blocks of said disk segment, on the basis of the contents of said bit-map.

* * * * *